(12) United States Patent
Balsells

(10) Patent No.: US 11,035,397 B2
(45) Date of Patent: Jun. 15, 2021

(54) SPRING LATCHING CONNECTORS

(71) Applicant: Bal Seal Engineering, LLC, Foothill Ranch, CA (US)

(72) Inventor: Peter J. Balsells, Newport Beach, CA (US)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 221 days.

(21) Appl. No.: 15/653,304

(22) Filed: Jul. 18, 2017

(65) Prior Publication Data

US 2017/0314602 A1    Nov. 2, 2017

Related U.S. Application Data

(63) Continuation of application No. 14/066,244, filed on Oct. 29, 2013, now Pat. No. 10,767,679, which is a continuation of application No. 13/843,018, filed on Mar. 15, 2013, now Pat. No. 9,534,625, which is a continuation of application No. 12/614,769, filed on Nov. 9, 2009, now Pat. No. 9,267,526, which is a
(Continued)

(51) Int. Cl.
| | |
|---|---|
| *F16F 1/04* | (2006.01) |
| *F16B 21/18* | (2006.01) |
| *F16L 37/12* | (2006.01) |
| *F16F 1/12* | (2006.01) |

(52) U.S. Cl.
CPC .............. *F16B 21/18* (2013.01); *F16F 1/045* (2013.01); *F16L 37/122* (2013.01); *F16F 1/12* (2013.01); *Y10T 29/49817* (2015.01); *Y10T 403/602* (2015.01); *Y10T 403/7075* (2015.01)

(58) Field of Classification Search
CPC ... F16F 1/045; F16F 1/12; F16B 21/18; F16L 37/22; Y10T 29/49817; Y10T 403/602; Y10T 403/7075
See application file for complete search history.

(56) References Cited

U.S. PATENT DOCUMENTS

| | | |
|---|---|---|
| 2,538,683 A | 1/1951 | Guiler |
| 2,797,937 A | 7/1957 | Frishof |
| (Continued) | | |

FOREIGN PATENT DOCUMENTS

| | | |
|---|---|---|
| DE | 19807663 | 9/1999 |
| GB | 2194298 | 3/1988 |
| (Continued) | | |

OTHER PUBLICATIONS

Non-Final Office Action on related US application (U.S. Appl. No. 10/860,199) dated Jan. 14, 2005.
(Continued)

*Primary Examiner* — Melody M Burch
(74) *Attorney, Agent, or Firm* — Klein, O'Neill & Singh, LLP

(57) ABSTRACT

A spring latching connector includes a housing having a bore therethrough, a piston slidably received in said bore, a circular groove formed in one of said bore and piston and a circular coil spring disposed in said groove for latching said piston and housing together. The groove is sized and shaped for controlling, in combination with a spring configuration, disconnect and connect forces of the spring latching connection.

38 Claims, 28 Drawing Sheets

Related U.S. Application Data continuation-in-part of application No. 10/860,199, filed on Jun. 2, 2004, now Pat. No. 8,167,285.

(60) Provisional application No. 60/476,105, filed on Jun. 4, 2003.

(56) References Cited

U.S. PATENT DOCUMENTS

| | | |
|---|---|---|
| 3,087,038 A | 4/1963 | Bethke |
| 3,105,556 A | 10/1963 | Raulins |
| 3,174,500 A | 3/1965 | Johnson et al. |
| 4,529,257 A | 7/1985 | Goodman et al. |
| 4,632,434 A | 12/1986 | Proctor et al. |
| 4,655,462 A | 4/1987 | Balsells |
| 4,678,210 A | 7/1987 | Balsells |
| 4,763,683 A | 8/1988 | Carmack |
| 4,804,290 A | 2/1989 | Balsells |
| 4,805,943 A * | 2/1989 | Balsells ............... F16B 21/078 267/167 |
| 4,872,710 A | 10/1989 | Konecny et al. |
| 4,876,781 A | 10/1989 | Balsells |
| 4,893,795 A | 1/1990 | Balsells |
| 4,905,733 A | 3/1990 | Carow |
| 4,906,031 A | 3/1990 | Vyse |
| 4,974,821 A | 12/1990 | Balsells |
| 5,082,390 A | 1/1992 | Balsells |
| 5,091,606 A | 2/1992 | Balsells |
| 5,108,078 A | 4/1992 | Balsells |
| 5,115,836 A | 5/1992 | Carow et al. |
| 5,134,244 A | 7/1992 | Balsells |
| 5,139,243 A | 8/1992 | Balsells |
| 5,139,276 A | 8/1992 | Balsells |
| 5,141,037 A | 8/1992 | Carmack et al. |
| 5,161,806 A | 11/1992 | Balsells |
| 5,255,723 A | 10/1993 | Carmack et al. |
| 5,265,890 A | 11/1993 | Balsells |
| 5,375,643 A | 12/1994 | Rude |
| 5,411,348 A | 5/1995 | Balsells |
| 5,433,247 A | 7/1995 | Guertin |
| 5,545,842 A | 8/1996 | Balsells |
| 5,570,719 A | 11/1996 | Richards et al. |
| 5,607,006 A | 3/1997 | Koch |
| 5,615,870 A | 4/1997 | Balsells |
| 5,709,371 A | 1/1998 | Balsells |
| 5,727,821 A | 3/1998 | Miller |
| 5,791,638 A | 8/1998 | Balsells |
| 6,520,222 B2 | 2/2003 | Carmack et al. |
| 6,672,565 B2 | 1/2004 | Russell |
| 6,749,358 B2 | 6/2004 | Balsells |
| 6,835,084 B2 | 12/2004 | Poon et al. |
| 7,075,455 B2 | 7/2006 | Nishimura et al. |
| 7,195,523 B2 | 3/2007 | Naviaux |
| 7,538,289 B2 | 5/2009 | Carroll |
| 7,722,415 B2 | 5/2010 | Changsrivong |
| 7,914,315 B2 | 3/2011 | Kuhn et al. |
| 7,914,351 B2 | 3/2011 | Balsells et al. |
| 8,052,459 B2 | 11/2011 | Smith et al. |
| 8,096,842 B2 | 1/2012 | Poon et al. |
| 8,166,623 B2 | 5/2012 | Balsells |
| 8,167,285 B2 | 5/2012 | Balsells |
| 8,297,662 B2 | 10/2012 | Balsells |
| 8,308,167 B2 | 11/2012 | Balsells et al. |
| 8,375,543 B1 | 2/2013 | Balsells |
| 8,382,532 B2 | 2/2013 | Sjostedt et al. |
| 8,491,346 B2 | 7/2013 | Sjostedt et al. |
| 8,561,274 B2 | 10/2013 | Balsells |
| 9,004,805 B2 | 4/2015 | Changsrivong et al. |
| 9,267,526 B2 | 2/2016 | Balsells |
| 9,284,970 B2 | 3/2016 | Dilmaghanian et al. |
| 9,312,630 B2 | 4/2016 | Huang |
| 9,482,255 B2 | 11/2016 | Changsrivong et al. |
| 9,500,211 B2 | 11/2016 | Changsrivong |
| 9,534,625 B2 | 1/2017 | Balsells |
| 9,677,587 B2 | 6/2017 | Changsrivong et al. |
| 2002/0122690 A1 | 9/2002 | Poon et al. |
| 2003/0096526 A1 | 5/2003 | Balsells |
| 2003/0157846 A1 | 8/2003 | Poon et al. |
| 2004/0245686 A1 | 12/2004 | Balsells |
| 2006/0228166 A1 | 10/2006 | Balsells |
| 2010/0279558 A1 | 11/2010 | Leon et al. |
| 2013/0149031 A1 | 6/2013 | Changsrivong et al. |
| 2014/0130329 A1 | 5/2014 | Changsrivong et al. |
| 2014/0162487 A1 | 6/2014 | Frederick et al. |
| 2014/0378008 A1 | 12/2014 | Young et al. |
| 2016/0076568 A1 | 3/2016 | Dilmaghanian et al. |
| 2016/0204557 A1 | 7/2016 | Kim |
| 2016/0265574 A1 | 9/2016 | Ghasiri |
| 2017/0352984 A1 | 12/2017 | Changsrivong et al. |
| 2017/0373425 A1 | 12/2017 | Rust |

FOREIGN PATENT DOCUMENTS

| | | |
|---|---|---|
| JP | 60113908 A | 6/1985 |
| WO | WO 03067713 | 8/2003 |
| WO | WO 2004/070891 | 8/2004 |

OTHER PUBLICATIONS

Non-Final Office Action on related US application (U.S. Appl. No. 12/614,769) dated Mar. 18, 2011.
Final Office Action on related US application (U.S. Appl. No. 12/614,769) dated Jul. 25, 2011.
Non-Final Office Action on related US application (U.S. Appl. No. 12/614,769) dated Jan. 5, 2012.
Final Office Action on related US application (U.S. Appl. No. 12/614,769) dated Apr. 11, 2012.
Non-Final Office Action on related US application (U.S. Appl. No. 12/614,769) dated Jul. 23, 2012.
Final Office Action on related US application (U.S. Appl. No. 12/614,769) dated Nov. 13, 2012.
Non-Final Office Action on related US application (U.S. Appl. No. 12/614,769) dated Jun. 12, 2014.
Non-Final Office Action on related US application (U.S. Appl. No. 13/843,018) dated Jan. 17, 2014.
Non-Final Office Action on related US application (U.S. Appl. No. 13/843,018) dated Oct. 1, 2014.
Non-Final Office Action on related US application (U.S. Appl. No. 14/066,244) dated Mar. 13, 2015.
Office Action on corresponding foreign application (EP Application No. 04753994.5) from the European Patent Office dated Apr. 2, 2014.
Latching and Holding With Bal Seal Canted-Coil Circular Welding Springs, Product News #164D, Nov. 23, 1991, Bal Seal Engineering Company, Inc., Santa Ana, California, U.S.A., (6 pages).
Bal Seal Canted Coil Springs, Circular and Spring Lengths for Radial and Axial Loading, Calatog No. DM3Mm, Rev. A, Jul. 17, 1992, Bal Seal Engineering Company, Inc., Santa Ana, CA, U.S.A., (24 pages).
Bal Seal Engineering, Bal Shield Solutions for EMI Applications, EMI Gasket Catalog DM8, Bal Seal Engineering Company, Inc., 2001, (14 pages).
Bal Seal Engineering, Bal-Springs for Holding, Latching, Locking, and Compressing Applications, Bal-Spring Catalog DM-9, Bal Seal Engineering Company, Inc., 2003, U.S.A. (21 pages).
Non-Final Office Action on co-pending US application (U.S. Appl. No. 16/109,479) dated Aug. 6, 2019.

\* cited by examiner

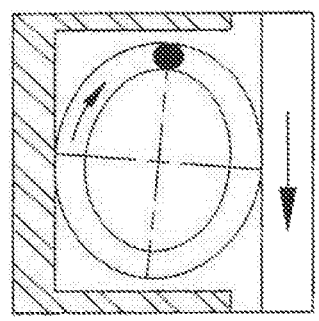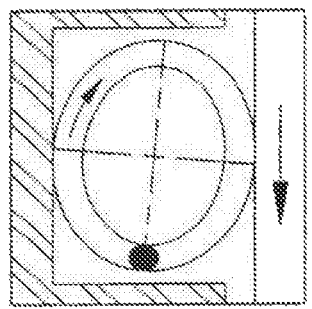

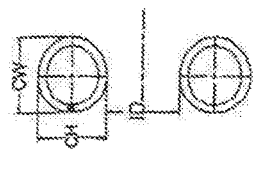
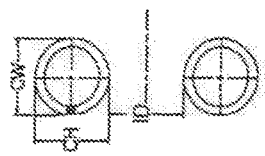
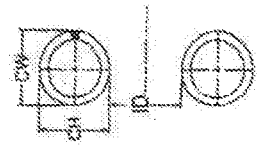
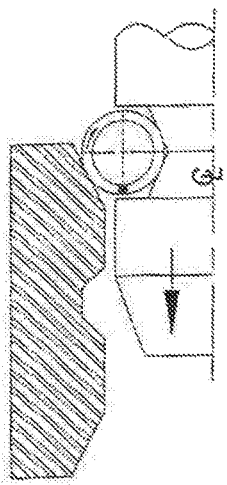
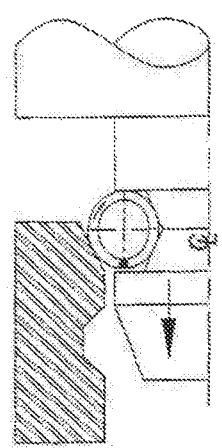
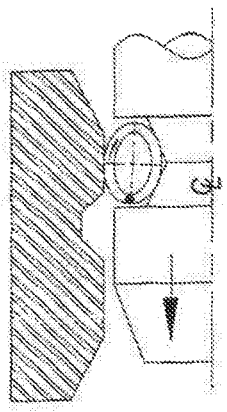
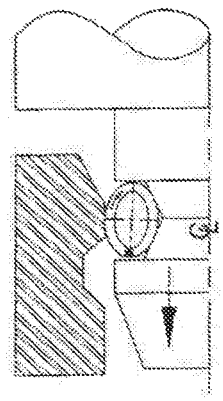
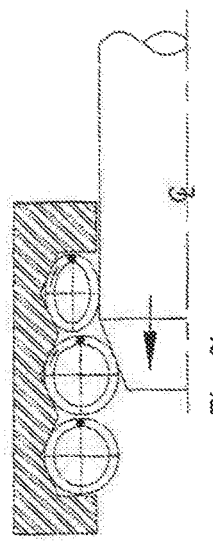
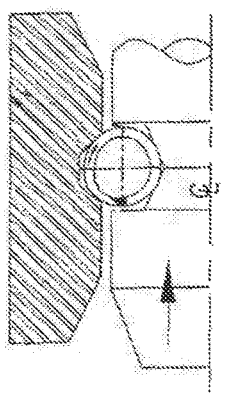
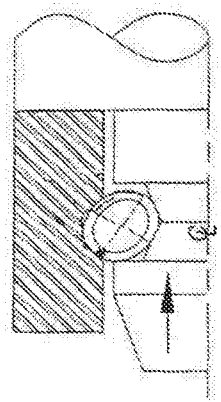
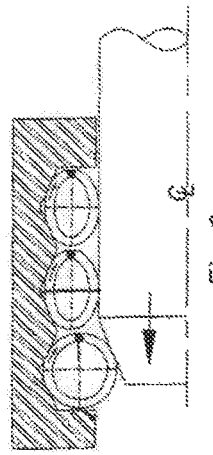

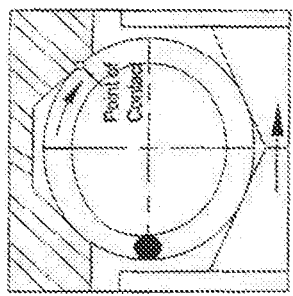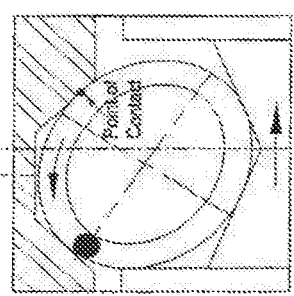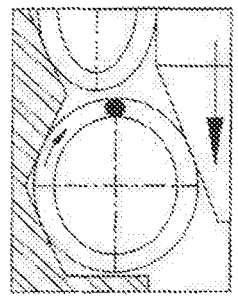

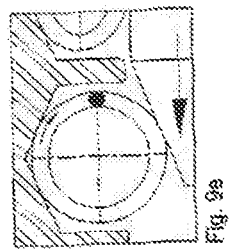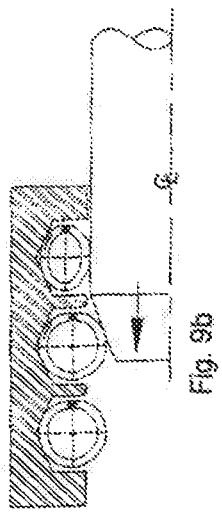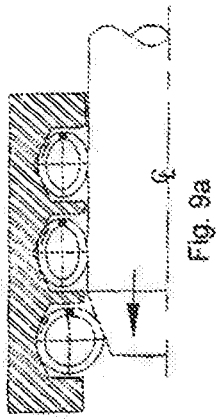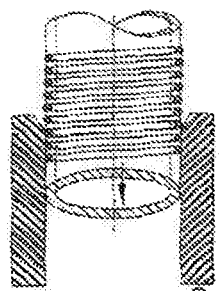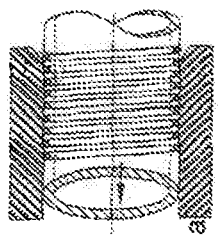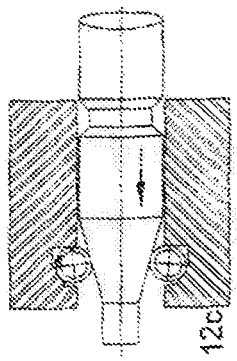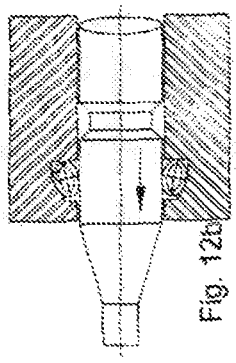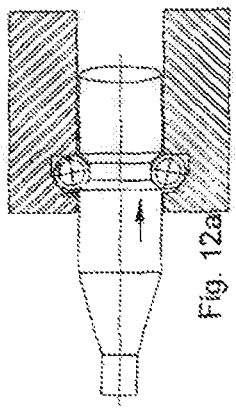

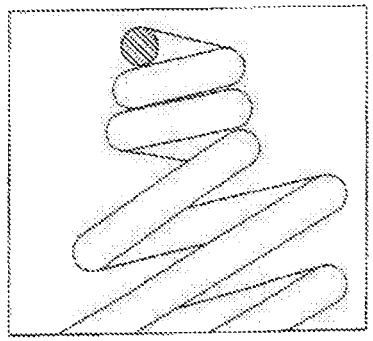
Fig. 14j
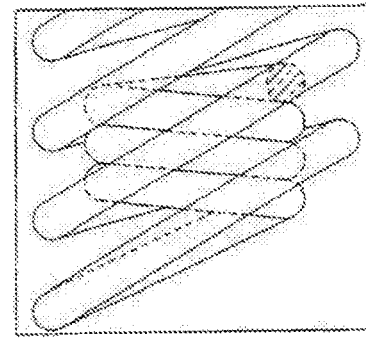
Fig. 14k
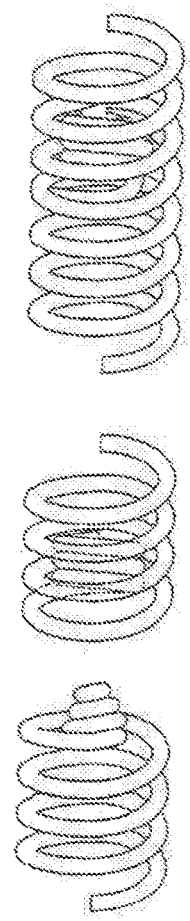
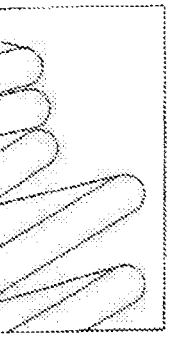
Fig. 14c
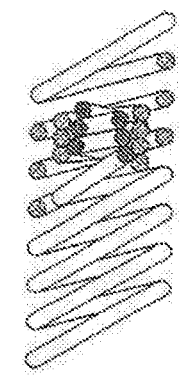
Fig. 14f
Fig. 14h
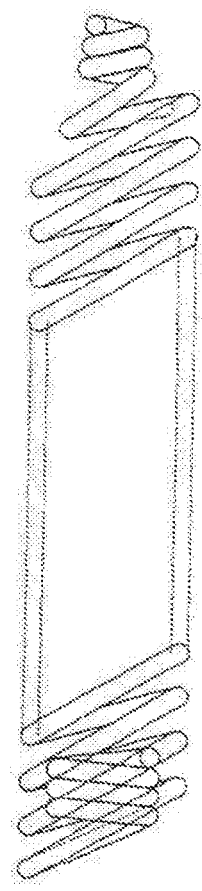
Fig. 14i
Fig. 14b
Fig. 14e
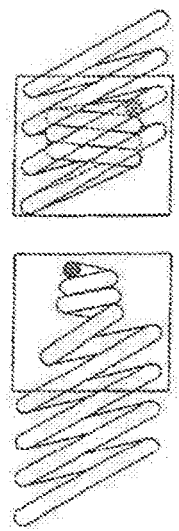
Fig. 14a
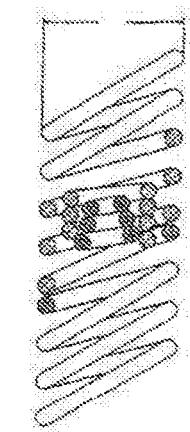
Fig. 14d
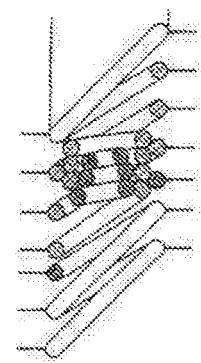
Fig. 14g

SPRING LATCHING CONNECTORS

FIELD OF ART

The present invention generally relates to connectors and is more directly related to the use of canted coil springs in connecting a piston and a housing for mechanical and electrical connection purposes.

BACKGROUND

The connection may be used to hold or latch and disconnect or unlatch. Various types of canted coil springs, such as radial, axial, or turn angle springs may be used depending on the characteristics desired for a particular application.

Axial springs may be RF with coils canting clockwise or F with coils canting counterclockwise, and installed or mounted with a front angle in front or in back relative to a direction of piston travel in an insertion movement. The springs can be mounted in various manners in a groove in either the piston or the housing. While the spring is generally mounted in a round piston or a round housing, the canted coil spring is capable of being utilized in non-circular applications such as elliptical, square, rectangular, or lengthwise grooves.

Various applications require differing force and force ratios for the initial insertion force, the running force, and the force required to latch and disconnect mating parts. The force, the degree of constraint of the spring, the spring design, the materials used, and the ability of the spring and housing combination to apply a scraping motion to remove oxides that may form on mating parts have been found in accordance with the present invention to determine the electrical performance of the connector. Electrical performance means the resistivity and the resistivity variability of the mated parts.

SUMMARY

It has been found that the force to connect and the force to disconnect as well as the ratio between the two is determined by the position of the point of contact relative to the end point of the major axis of the spring when the disconnect or unlatch force is applied and the characteristics of the spring and the spring installation or mounting. The maximum force for a given spring occurs when the point of contact is close to the end point of the major axis of the spring. The minimum force for a given spring occurs when the contact point is at the maximum distance from the end point of the major axis, which is the end point of the minor axis of the spring. This invention deals in part with the manner in which the end point is positioned. The material, spring design, and method of installing the spring determine the spring influenced performance characteristics of the invention.

Accordingly, a spring latching connector in accordance with the present invention generally includes a housing having a bore therethrough along with a piston slidably received in the bore. In one embodiment, the housing bore and piston abut one another in order to eliminate axial play.

A circular groove is formed in one of the bore and the piston and a circular coil spring is disposed in the groove for latching the piston in a housing together.

Specifically, in accordance with the present invention a groove is sized and shaped for controlling, in combination with a spring configuration, the disconnect and connect forces of the spring latching connector.

The circular coil spring preferably includes coils having a major axis and a minor axis and the circular groove includes a cavity for positioning a point of contact in relation to an end of the coil major axis in order to determine the disconnect and the connect forces. More specifically, the groove cavity positions the point of contact proximate the coil major axis in order to maximize the disconnect forces. Alternatively, the groove cavity may be positioned in order that the point of contact is proximate an end of the minor axis in order to minimize the disconnect force.

In addition, the coil height and groove width may be adjusted in accordance with the present invention to control the disconnect and connect forces.

Further, a major axis of the coil spring is disposed above an inside diameter of a housing groove for a housing mounted coil spring and below an outer diameter of a piston groove for a piston-mounted coil spring.

BRIEF DESCRIPTION OF THE DRAWINGS

The present invention may be more clearly understood with reference to the following detailed description in conjunction with the appended drawings of which:

FIG. 2E shows a cross sectional view of the spring mounted in a housing, a reference dot point indicating a position of a front angle of a coil, "the end point of a major axis of the coil" being used to explain the relationship between a point of contact and the end point of the major axis of the coil when determining the unlatching or disconnect force, the dot point showing a position of the front angle of the coil;

FIGS. 3A-3E show a radial spring mounted clockwise in a flat bottom housing groove with the front angle in the back, the spring having coils canting clockwise;

FIGS. 6A-6E and 7A-7E show the same type of design but piston mounted. FIGS. 6A-6E show a latching radial spring in a latching groove, piston mounted, while FIGS. 7A-7E shows a latching radial spring with offset axial grooves for minimal axial play piston mounted. The features are the same as indicated in FIGS. 4A-4E and 5A-5E except piston mounted.

FIG. 7A shows an abutting relationship between a housing bore and piston similar to FIG. 5A;

FIGS. 8A-8D show a series of circular grooves holding multiple radial springs mounted one in each groove. Each spring is separate from the others, FIG. 8B showing one spring being compressed radially by the shaft as it moves in the direction of the arrow, FIG. 8A showing two springs deflected radially in the direction of the arrow, FIG. 8D showing a cross section of the spring. Springs in a multiple manner could also be axial;

FIGS. 9A-9E show a holding multiple radial springs mounted in multiple grooves, this design being similar to the one indicated in FIGS. 8A-8E but the grooves are physically separated from each other, springs in a multiple manner may also be axial;

FIGS. 10A-10D show a holding length spring mounted axially in a threaded groove, FIG. 10B showing the piston partially engaging the housing by deflecting the spring coils, FIG. 10A showing the shaft moving in the direction of the arrow with further compression of the spring coils, FIG. 10D showing a length of the spring;

FIGS. 11A-11E shows a face compression axial spring retained by inside angular sidewall;

FIGS. 12A-12E show a latching radial spring in a radial groove designed for high disconnect to insertion ratio shown radially loaded and causing the coils to turn to provide axial load to reduce axial movement. GW>CH;

FIGS. 14A-14K show a spring with ends threaded to form a continuous spring-ring without welding joining, which is different than the design indicated in FIG. 1;

FIGS. 17A-17L show a spring with coils ends butted inside the groove forming a spring-ring without welding.

FIG. 19*a*, row 2, columns 2-13, shows different views of a stepwise insertion of a pin into a housing having a groove with a flat bottom and a canted coil spring located therein, which has a counterclockwise turning direction.

FIG. 19*a*, row 3, columns 2-13, shows different views of a stepwise insertion of a pin into a housing having a groove with a flat bottom and a canted coil spring located therein, which has a clockwise turning direction.

FIG. 19*a*, row 4, columns 2-13, shows different views of a stepwise insertion of a pin into a housing having a groove with a V-bottom and a canted coil spring located therein, which has a counterclockwise turning direction.

FIG. 19*a*, row 5, columns 2-13, shows different views of a stepwise insertion of a pin into a housing having a groove with a V-bottom and a canted coil spring located therein, which has a clockwise turning direction.

FIG. 19*a*, row 6, columns 2-13, shows different views of a stepwise insertion of a pin into a housing having a flat bottom groove having a canted coil spring located therein, which has a counterclockwise turning direction.

FIG. 19*a*, row 7, columns 2-15, shows different views of a stepwise insertion of a pin into a housing with a flat bottom groove with a canted coil spring located therein, which can be clockwise turning direction or a counterclockwise turning direction.

FIG. 19*a*, row 8, columns 2-15, shows different views of a stepwise insertion of a pin into a housing with a flat bottom groove with a canted coil spring located therein, which can be a counterclockwise turning direction.

FIG. 19*a*, row 9, columns 2-15, shows different views of a stepwise insertion of a pin into a housing with a flat bottom groove with a canted coil spring located therein, which can be a clockwise turning direction.

FIG. 19*b*, row 2, columns 2-15, shows different views of a stepwise insertion of a pin into a housing with a flat bottom groove with a canted coil spring located therein, which can be a clockwise turning direction or a clockwise turning direction.

FIG. 19*b*, row 3, columns 2-13, shows different views of a stepwise insertion of a pin into a housing with a v-bottom groove with a canted coil spring located therein, which can be a clockwise turning direction.

FIG. 19*b*, row 4, columns 2-13, shows different views of a stepwise insertion of a pin into a housing with a flat bottom groove with a canted coil spring located therein, which can be a clockwise turning direction.

FIG. 19*b*, row 5, columns 2-13, shows different views of a stepwise insertion of a pin into a housing with a v-bottom groove with a canted coil spring located therein, which can be a clockwise turning direction.

FIG. 19*b*, row 6, columns 2-15, shows different views of a stepwise insertion of a pin into a housing with a v-bottom groove with a canted coil spring located therein, which can be a clockwise turning direction, and the coils can be off-setting along the coil axis.

FIG. 19*b*, row 7, columns 2-13, shows different views of a stepwise insertion of a stepwise insertion of a pin into a housing with a semi-tapered groove with a canted coil spring located therein, which can be a clockwise turning direction.

FIG. 19*b*, row 8, columns 2-13, shows different views of a stepwise insertion of a pin into a housing with a tapered-bottom groove with a canted coil spring located therein, which can be a clockwise turning direction.

FIG. 19*b*, row 9, columns 2-13, shows different views of a stepwise insertion of a pin into a housing with a unidirectional-tapered-bottom groove with a canted coil spring located therein, which can be a clockwise turning direction.

FIG. 19*c*, row 2, columns 2-13, shows different views of a stepwise insertion of a pin into a housing with a unidirectional-tapered-bottom groove with a canted coil spring located therein, which can be a clockwise turning direction.

FIG. 19*c*, row 3, columns 2-13, shows different views of a stepwise insertion of a pin into a housing with a unidirectional-tapered-bottom groove with a canted coil spring located therein, which can be a clockwise turning direction.

FIG. 19*c*, row 4, columns 2-13, shows different views of a stepwise insertion of a pin into a housing with a tapered-bottom groove with a canted coil spring located therein, which can be a clockwise turning direction in the opposite direction.

FIG. 19*c*, row 5, columns 2-13, shows different views of a stepwise insertion of a pin into a housing with a tapered-bottom groove with a canted coil spring located therein, which can be a clockwise turning direction in the opposite direction.

FIG. 19*c*, row 6, columns 2-13, shows different views of a stepwise insertion of a pin into a housing with a tapered-bottom groove with a canted coil spring located therein, which can be a clockwise turning direction.

FIG. 19c, row 7, columns 2-13, shows different views of a stepwise insertion of a pin into a housing with a tapered-bottom groove with a canted coil spring located therein, which can be a clockwise turning direction.

FIG. 19c, row 8, columns 2-13, shows different views of a stepwise insertion of a pin into a housing with a round-bottom groove with a canted coil spring located therein, which can be a clockwise turning direction.

FIG. 19c, row 9, columns 2-13, shows different views of a stepwise insertion of a pin into a housing with an inverted-V-bottom groove with a canted coil spring located therein, which can be a clockwise turning direction.

FIG. 19d, row 2, columns 2-15, shows different views of a stepwise insertion of a pin into a housing with a tapered-bottom groove with a canted coil spring located therein, which can be a counterblockwise or a clockwise turning direction.

FIG. 19d, row 3, columns 2-15, shows different views of a stepwise insertion of a pin into a housing with a tapered-bottom groove with a canted coil spring located therein, which can be a counterclockwise turning direction.

FIG. 19d, row 4, columns 2-15, shows different views of a stepwise insertion of a pin into a housing with a tapered-bottom groove with a canted coil spring located therein, which can be a clockwise turning direction.

FIG. 19d, row 5, columns 2-15, shows different views of a stepwise insertion of a pin into a housing with a tapered-bottom groove with a canted coil spring located therein, which can be a clockwise or a counterclockwise turning direction.

FIG. 19d, row 6, columns 2-13, shows different views of a stepwise insertion of a pin into a housing with a dovetail groove with a canted coil spring located therein, which can be a counterclockwise turning direction.

FIG. 19d, row 7, columns 2-13, shows different views of a stepwise insertion of a pin into a housing with a special groove with a canted coil spring located therein, which can be a counterclockwise turning direction.

FIG. 19d, row 8, columns 2-13, shows different views of a stepwise insertion of a pin into a housing with an angle 0°-22.5° bottom groove with a canted coil spring located therein, which can be a counterclockwise turning direction.

FIG. 19d, row 9, columns 2-13, shows different views of a stepwise insertion of a pin into a housing with an angle 0°-22.5° bottom groove with a canted coil spring located therein, which can be a clockwise turning direction.

FIG. 19e, row 2, columns 2-13, shows different views of a stepwise insertion of a pin into a housing with an angle 0°-22.5° bottom groove with a canted coil spring located therein, which can be a counterclockwise turning direction.

FIG. 19e, row 3, columns 2-13, shows different views of a stepwise insertion of a pin into a housing with an angle 22.5°-22.5° bottom groove with a canted coil spring located therein, which can be a counterclockwise turning direction.

FIG. 19e, row 4, columns 2-13, shows different views of a stepwise insertion of a pin into a housing with an angle 30.0°-22.5° bottom groove with a canted coil spring located therein, which can be a counterclockwise turning direction.

FIG. 19e, row 5, columns 2-13, shows different views of a stepwise insertion of a pin into a housing with an angle 60.0°-22.5° bottom groove with a canted coil spring located therein, which can be a counterclockwise turning direction.

FIG. 19e, row 6, columns 2-13, shows different views of a stepwise insertion of a pin into a housing with a special V-bottom with 23° and 60° angles groove with a canted coil spring located therein, which can be a counterclockwise turning direction.

FIG. 19e, row 7, columns 2-13, shows different views of a stepwise insertion of a pin into a housing with a special V-bottom with 23° and 60° angles groove with a canted coil spring located therein, which can be a counterclockwise turning direction that continues to travel forward after latching and then travels back.

FIG. 19e, row 8, columns 2-13, shows different views of a stepwise insertion of a pin into a housing with a special V-bottom with 22°-60° angles groove with a canted coil spring located therein, which can be a counterclockwise turning direction.

FIG. 19e, row 9, columns 2-13, shows different views of a stepwise insertion of a pin into a housing with a special V-bottom with 23° and 60° angles groove with a canted coil spring located therein, which has a 20° clockwise turn angle.

FIG. 19e, row 10, columns 2-13, shows different views of a stepwise insertion of a pin into a housing with a special V-bottom with 30° and 60° angles groove with a canted coil spring located therein, which has a 20° clockwise turn angle.

FIG. 19f, row 2, columns 2-13, shows different views of a stepwise insertion of a pin into a housing with a special V-bottom with 30° and 60° angles groove with a canted coil spring located therein, which has a 20° clockwise turn angle.

FIG. 19f row 3, columns 2-13, shows different views of a stepwise insertion of a pin into a housing with a special V-bottom with 60° and 49° angles groove with a canted coil spring located therein, which has a 20° clockwise turn angle.

FIG. 19f, row 4, columns 2-13, shows different views of a stepwise insertion of a pin into a housing with a special groove with a canted coil spring located therein, which has a 45° clockwise turn angle.

FIG. 19f, row 5, columns 2-13, shows different views of a stepwise insertion of a pin into a housing with a special-tapered-bottom with 30° angle groove with a canted coil spring located therein, which has a 45° clockwise turn angle.

FIG. 19f, row 6, columns 2-13, shows different views of a stepwise insertion of a pin into a housing with a side-located angular groove with a canted coil spring located therein, which can be a clockwise turning direction.

FIG. 19f, row 7, columns 2-13, shows different views of a stepwise insertion of a pin into a housing with a side-loaded-no-angle groove with a canted coil spring located therein, which can be a clockwise turning direction.

FIG. 19f, row 8, columns 2-13, shows different views of a stepwise insertion of a pin into a housing with a side-loaded-symmetrical-angles groove with a canted coil spring located therein, which can be a clockwise turning direction.

FIG. 19f, row 9, columns 2-13, shows different views of a stepwise insertion of a pin, with a flat bottom groove, into a housing with a flat-bottom groove with a canted coil spring located therein, which can be a counterclockwise turning direction.

FIG. 19g, row 2, columns 2-13, shows insertion and removal of a panel into a groove and canted coil spring reaction during the process.

FIG. 19g, row 3, columns 2-13, shows insertion and removal of a panel into a groove and canted coil spring reaction during the process.

FIG. 19g, row 4, columns 2-13, shows insertion and removal of a panel into a groove and canted coil spring reaction during the process.

FIG. 19g, row 5, columns 2-13, shows insertion and removal of a panel into a groove and canted coil spring reaction during the process.

FIG. 19g, row 6, columns 2-13, shows insertion and removal of a panel into a groove and canted coil spring reaction during the process.

FIG. 19g, row 7 columns 2-13, shows different views of a stepwise insertion of a pin into a housing with an angle 22.5°-22.5° bottom groove with a canted coil spring located therein, which can be a counterclockwise turning direction.

FIG. 19g, row 8, columns 2-13, shows different views of a stepwise insertion of a pin into a housing with an angle 22.5°-22.5° bottom groove with a canted coil spring located therein, which can be a counterclockwise turning direction.

FIG. 19g, row 9, columns 2-13, shows different views of a stepwise insertion of a pin into a housing with an angle 22.5°-22.5° bottom groove with a canted coil spring located therein, which can be a counterclockwise turning direction.

FIG. 20a, row 2, columns 2-13, shows different views of a stepwise insertion of a pin with a flat-bottom groove with a canted coil spring located therein into a housing, wherein the spring can be a counterclockwise turning direction.

FIG. 20a, row 3, columns 2-13, shows different views of a stepwise insertion of a pin with a flat-bottom groove with a canted coil spring located therein into a housing, wherein the spring can be a clockwise turning direction.

FIG. 20a, row 4, columns 2-13, shows different views of a stepwise insertion of a pin with a V-bottom groove with a canted coil spring located therein into a housing, wherein the spring can be a counterclockwise turning direction.

FIG. 20a, row 5, columns 2-13, shows different views of a stepwise insertion of a pin with a flat-bottom axial groove with a canted coil spring located therein into a housing, wherein the spring can be a clockwise turning direction.

FIG. 20a, row 6, columns 2-13, shows different views of a stepwise insertion of a pin with a flat-bottom-axial groove with a canted coil spring located therein into a housing, which can be a counterclockwise turning direction.

FIG. 20a, row 7, columns 2-15, shows different views of a stepwise insertion of a pin with a flat-bottom-axial groove with a canted coil spring located therein that is mounted in RF axial position into a housing, wherein the spring can be a counterclockwise or clockwise turning direction.

FIG. 20a, row 8, columns 2-15, shows different views of a stepwise insertion of a pin with a flat-bottom-axial groove with a canted coil spring located therein that is mounted in F axial position into a housing, which can be a counterclockwise or clockwise turning direction.

FIG. 20a, row 9, columns 2-15, shows different views of a stepwise insertion of a pin with a flat-bottom-axial groove with a canted coil spring located therein that is mounted in RF axial position into a housing, which can be a clockwise turning direction.

FIG. 20b, row 2, columns 2-15, shows different views of a stepwise insertion of a pin with a flat-bottom-axial groove with a canted coil spring located therein that is mounted in F axial position into a housing, wherein the spring can be a clockwise turning direction.

FIG. 20b, row 3, columns 2-13, shows different views of a stepwise insertion of a pin with a V-bottom groove with a canted coil spring located therein into a housing, wherein the spring can be a clockwise turning direction.

FIG. 20b, row 4, columns 2-13, shows different views of a stepwise insertion of a pin with a flat-bottom groove with a canted coil spring located therein into a housing, which can be a clockwise turning direction.

FIG. 20b, row 5, columns 2-13, shows different views of a stepwise insertion of a pin with a V-bottom-tapered groove with a canted coil spring located therein into a housing, wherein the spring can be a clockwise turning direction.

FIG. 20b, row 6, columns 2-15, shows different views of a stepwise insertion of a pin with a V-bottomed-tapered groove with a canted and offset coil spring located therein into a housing, wherein the spring can be a clockwise turning direction.

FIG. 20b, row 7, columns 2-13, shows different views of a stepwise insertion of a pin with a semi-tapered groove with a canted coil spring located therein into a housing, wherein the spring can be a clockwise turning direction.

FIG. 20b, row 8, columns 2-13, shows different views of a stepwise insertion of a pin with a tapered-bottom groove with a canted coil spring located therein into a housing, wherein the spring can be a clockwise turning direction.

FIG. 20b, row 9, columns 2-13, shows different views of a stepwise insertion of a pin with a unidirectional-tapered bottom groove with a smaller GW and a canted coil spring located therein into a housing, wherein the spring can be a clockwise turning direction.

FIG. 20c, row 2, columns 2-13, shows different views of a stepwise insertion of a pin with a unidirectional-tapered-bottom groove with a smaller GD and a canted coil spring located therein into a housing, wherein the spring can be a clockwise turning direction.

FIG. 20c, row 3, columns 2-13, shows different views of a stepwise insertion of a pin with a unidirectional-tapered-bottom groove with a larger tapered angle and a canted coil spring located therein into a housing, wherein the spring can be a clockwise turning direction.

FIG. 20c, row 4, columns 2-13, shows different views of a stepwise insertion of a pin with a tapered-bottom groove with a RF axial spring shaft inserted in the opposite direction and a canted coil spring located therein into a housing, wherein the spring can be a clockwise turning direction.

FIG. 20c, row 5, columns 2-13, shows different views of a stepwise insertion of a pin with a tapered-bottom groove with 45° turn angle spring-shaft travels in the convex direction and a canted coil spring located therein into a housing, wherein the spring can be a clockwise turning direction.

FIG. 20c, row 6, columns 2-13, shows different views of a stepwise insertion of a pin with a tapered-bottom groove with a RF axial spring filled with elastomer (hollowed) and a canted coil spring located therein into a housing, wherein the spring can be a clockwise turning direction.

FIG. 20c, row 7, columns 2-13, shows different views of a stepwise insertion of a pin with a tapered-bottom groove with a RF axial spring filled with elastomer (solid) and a canted coil spring located therein into a housing, wherein the spring can be a clockwise turning direction.

FIG. 20c, row 8, columns 2-13, shows different views of a stepwise insertion of a pin with a round-bottom groove with a canted coil spring located therein into a housing, wherein the spring can be a clockwise turning direction.

FIG. 20c, row 9, columns 2-13, shows different views of a stepwise insertion of a pin with an inverted-V-bottom groove with a canted coil spring located therein into a housing, wherein the spring can be a clockwise turning direction.

FIG. 20d, row 2, columns 2-15, shows different views of a stepwise insertion of a pin with a tapered-bottom groove with a canted coil spring located therein that is mounted in RF axial position into a housing, which can be a counterclockwise or a clockwise turning direction.

FIG. 20d, row 3, columns 2-15, shows different views of a stepwise insertion of a pin with a tapered-bottom groove with a canted coil spring located therein that is mounted in F axial position into a housing, wherein the spring can be a counterclockwise turning direction.

FIG. 20d, row 4, columns 2-15, shows different views of a stepwise insertion of a pin with a tapered-bottom groove with a canted coil spring located therein that is mounted in RF axial position into a housing, wherein the spring can be a clockwise turning direction.

FIG. 20d, row 5, columns 2-15, shows different views of a stepwise insertion of a pin with a canted coil spring located therein that is mounted in F axial position into a housing with a tapered- bottom groove, wherein the spring can be a clockwise or a counterclockwise turning direction.

FIG. 20d, row 6, columns 2-13, shows different views of a stepwise insertion of a pin with a dovetail groove with a canted coil spring located therein into a housing, wherein the spring can be a counterclockwise turning direction.

FIG. 20d, row 7, columns 2-13, shows different views of a stepwise insertion of a pin with a special groove with a canted coil spring located therein into a housing, wherein the spring can be a counterclockwise turning direction.

FIG. 20d, row 8, columns 2-13, shows different views of a stepwise insertion of a pin with an angle 0°-22.5°-bottom groove with a canted coil spring located therein into a housing, wherein the spring can be a counterclockwise turning direction.

FIG. 20d, row 9, columns 2-13, shows different views of a stepwise insertion of a pin with an angle 0°-22.5°-bottom groove with a canted coil spring with a small diameter located therein into a housing, wherein the spring can be a clockwise turning direction.

FIG. 20e, row 2, columns 2-13, shows different views of a stepwise insertion of a pin with an angle 0°-22.5°-bottom groove with a canted coil spring located therein into a housing, wherein the spring can be a counterclockwise turning direction.

FIG. 20e, row 3, columns 2-13, shows different views of a stepwise insertion of a pin with an angle 22.5°-22.5°-bottom groove with a canted coil spring located therein into a housing, wherein the spring can be a counterclockwise turning direction.

FIG. 20e, row 4, columns 2-13, shows different views of a stepwise insertion of a pin with an angle 30.0°-22.5°-bottom groove with a canted coil spring located therein into a housing, wherein the spring can be a counterclockwise turning direction.

Figure 20A:
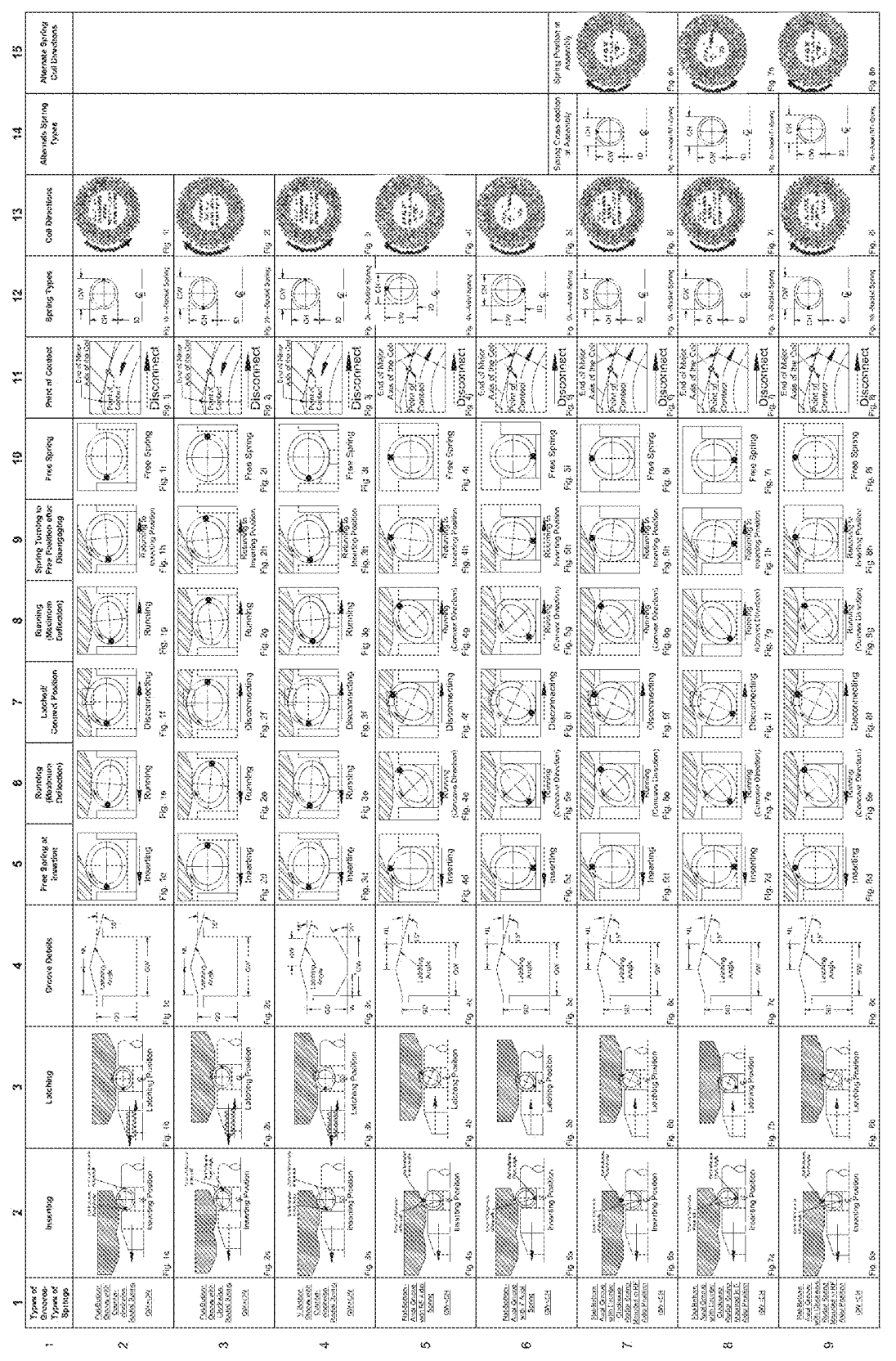
Figure 20B:
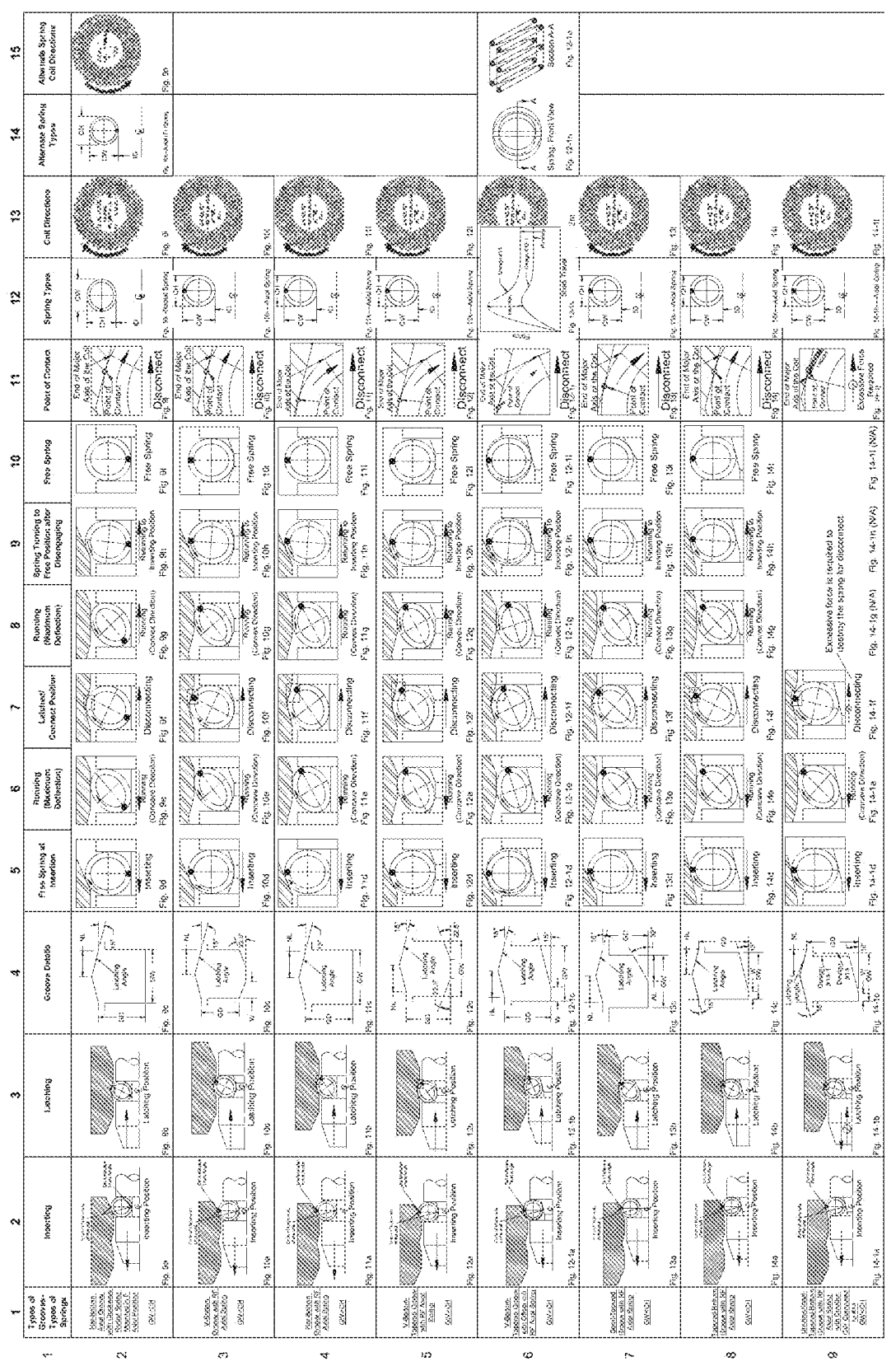
Figure 20C:
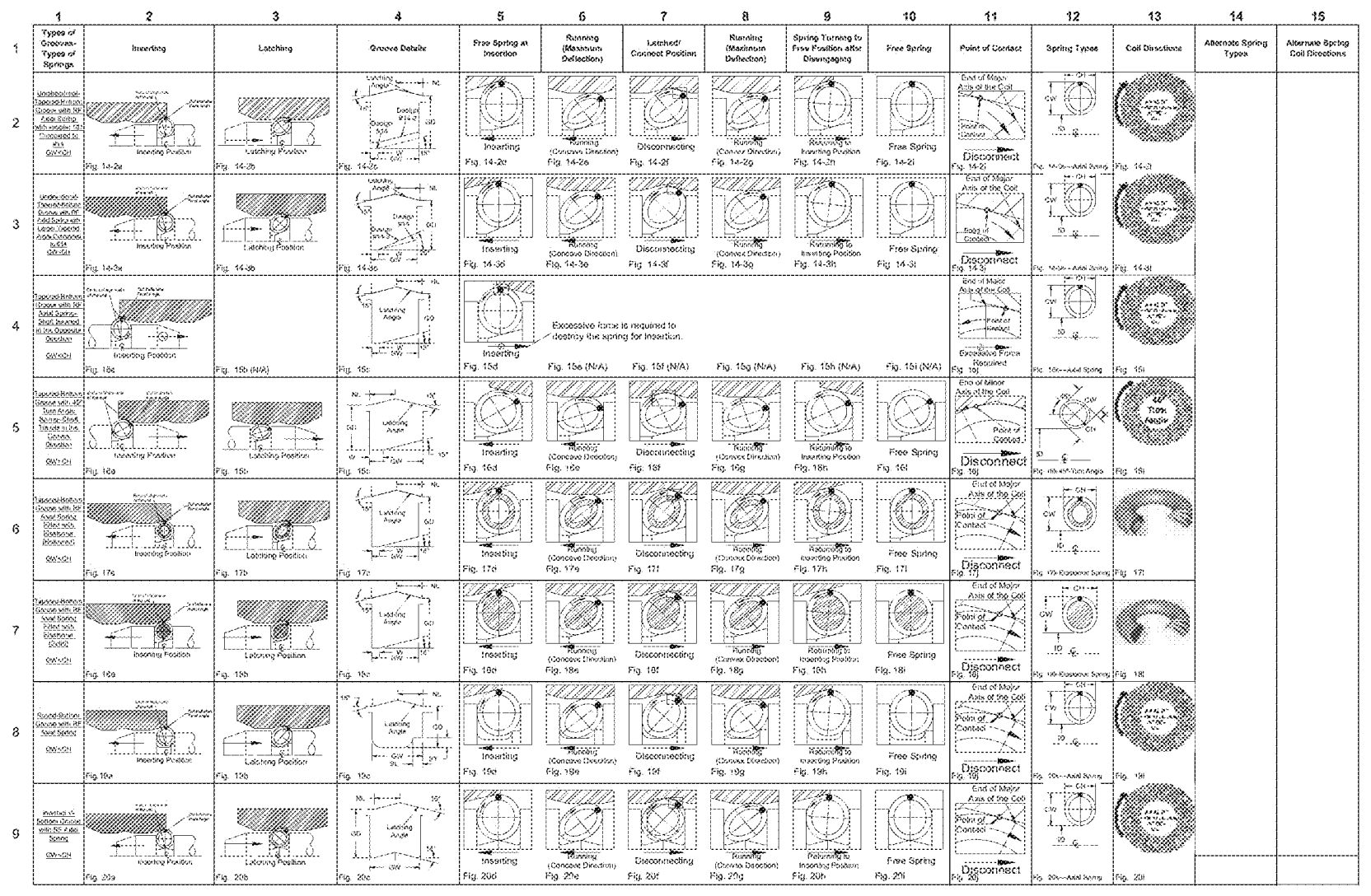
Figure 20D:
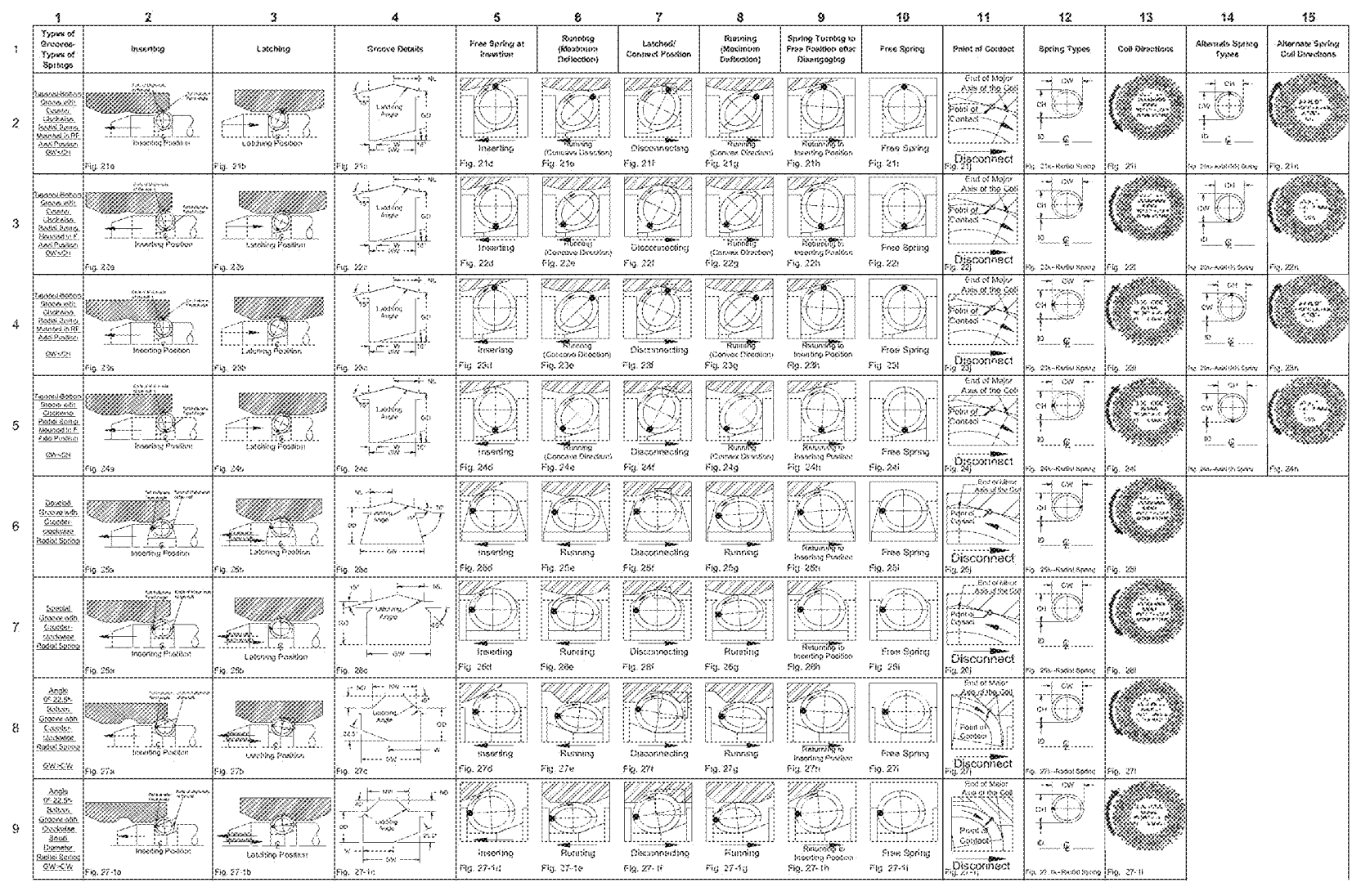
Figure 20E:
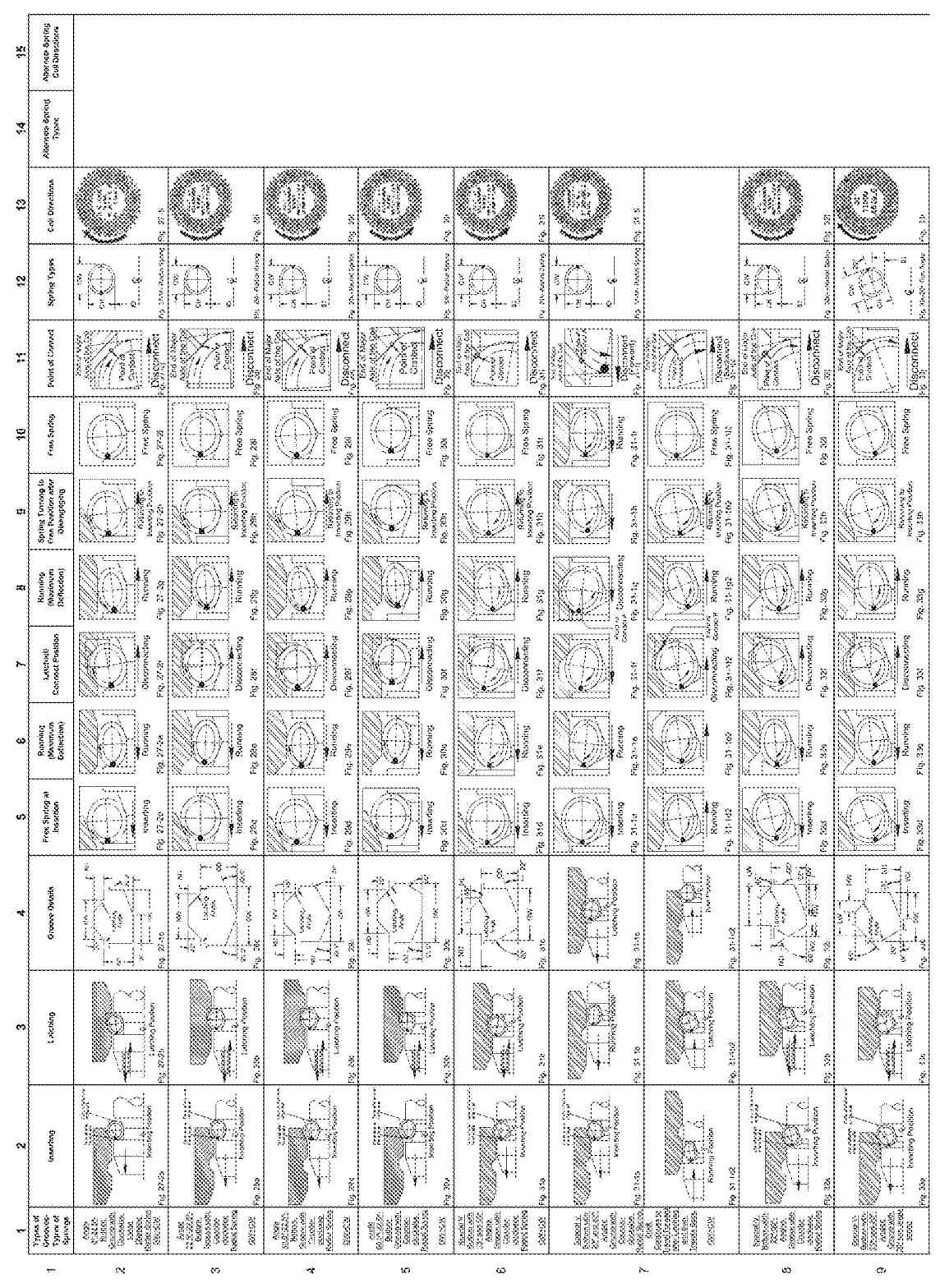
Figure 1F:
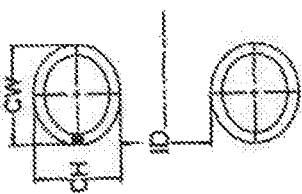
FIG. 1F shows a cross sectional view of a radial spring.
Figure 2D:
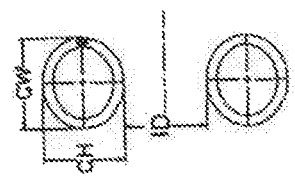
FIG. 2D shows a cross sectional view of the spring.
Figure 1C:
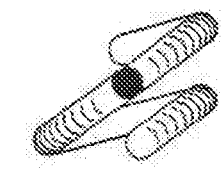
FIG. 1C shows the position of the front and back angle.
Figure 1E:
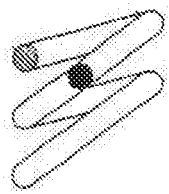
FIG. 1E shows the position of the front and back angles.
Figure 2C:
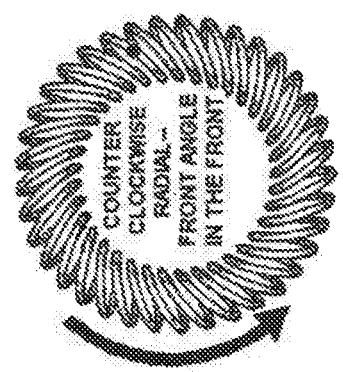
FIG. 2C shows a front view of a counterclockwise radial spring with a front angle in the front.

FIG. 20e, row 5, columns 2-13, shows different views of a stepwise insertion of a pin with an angle 60.0°-22.5°-bottom groove with a canted coil spring located therein into a housing, wherein the spring can be a counterclockwise turning direction.

FIG. 20e, row 6, columns 2-13, shows different views of a stepwise insertion of a pin with a special-V-bottom with 23° and 60° angles groove with a canted coil spring located therein into a housing, wherein the spring can be a counterclockwise turning direction.

FIG. 20e, row 7, columns 2-13, shows different views of a stepwise insertion of a pin with a special-V-bottom with 23° and 60° angles groove with a radial spring shaft that continues to travel forward after latching and then travels back and a canted coil spring located therein into a housing, wherein the spring can be a counterclockwise turning direction.

FIG. 20e, row 8, columns 2-13, shows different views of a stepwise insertion of a pin with a special-V-bottom with 22°-60° angles groove with a canted coil spring located therein into a housing, wherein the spring can be a counterclockwise turning direction.

FIG. 20e, row 9, columns 2-13, shows different views of a stepwise insertion of a pin with a special V-bottom with 23° and 60° angles groove with a canted coil spring located therein into a housing, wherein the spring has a 20° clockwise turning angle.

Figure 20F:
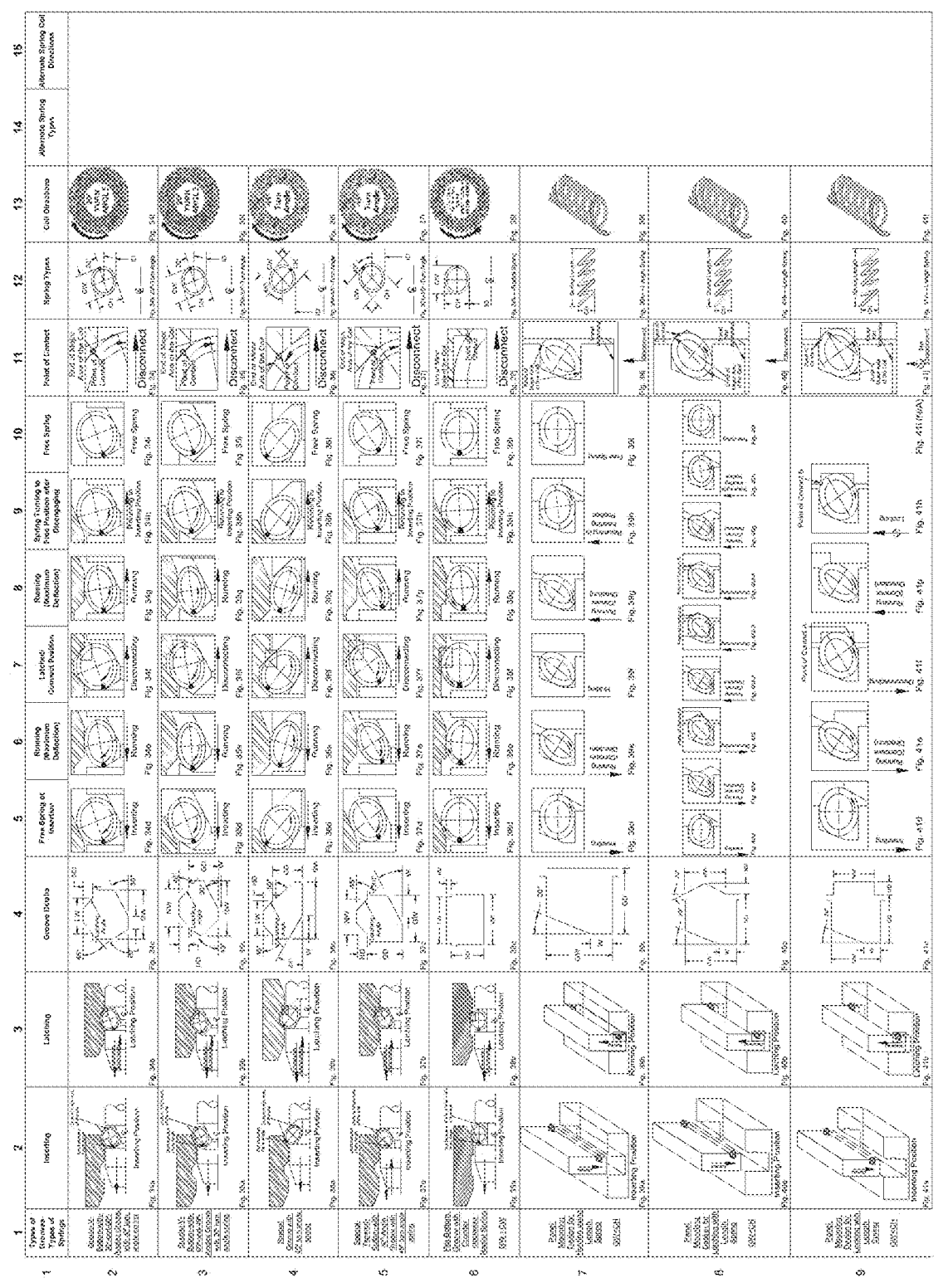

FIG. 20f, row 2, columns 2-13, shows different views of a stepwise insertion of a pin with a special V-bottom with 30° and 60° angles groove with a canted coil spring located therein into a housing, wherein the spring has a 30° clockwise turning angle.

FIG. 20f, row 3, columns 2-13, shows different views of a stepwise insertion of a pin with a special V-bottom with 60° and 49° angles groove with a canted coil spring located therein into a housing, wherein the spring has a 20° clockwise turning angle.

FIG. 20f, row 4, columns 2-13, shows different views of a stepwise insertion of a pin with a special groove with a canted coil spring located therein into a housing, wherein the spring has a 45° clockwise turning angle.

FIG. 20f, row 5, columns 2-13, shows different views of a stepwise insertion of a pin with a special-tapered-bottom with 30° angle groove with a canted coil spring located therein into a housing, wherein the spring has a 45° clockwise turning angle.

FIG. 20f row 6, columns 2-13, shows different views of a stepwise insertion of a pin with a flat-bottom groove with a canted coil spring located therein into a housing, wherein the spring can be a counterclockwise turning direction.

FIG. 20f, row 7, columns 2-13, shows different views of a stepwise insertion of a plate having a groove with a canted coil spring located therein into a base.

FIG. 20f, row 8, columns 2-13, shows different views of a stepwise insertion of a plate having a groove with a cated coil spring located therein into a base.

FIG. 20f, row 9, columns 2-13, shows different views of a stepwise insertion of a plate having a groove with a canted coil spring located therein into a base.

Figure 20G:
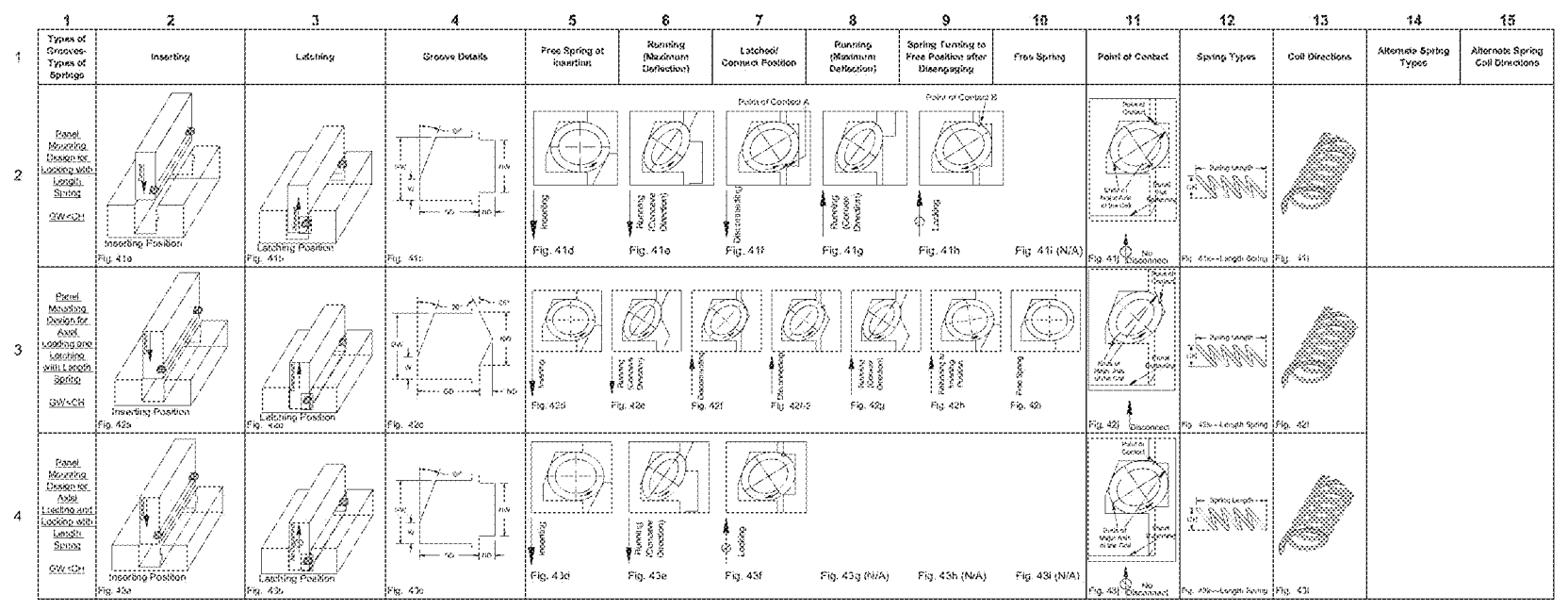

FIG. 20g, row 2, columns 2-13, shows different views of a stepwise insertion of a plate having a groove with a canted coil spring located therein into a base.

FIG. 20g, row 3, columns 2-13, shows different views of a stepwise insertion of a plate having a groove with a canted coil spring located therein into a base.

FIG. 20g, row 4, columns 2-13, shows different views of a stepwise insertion of a plate having a groove with a canted coil spring located therein into a base.

DETAILED DESCRIPTION

Connectors using latching applications have been described extensively, as for example, U.S. Pat. Nos. 4,974,821, 5,139,276, 5,082,390, 5,545,842, 5,411,348 and others.

Groove configurations have been divided in two types: one type with a spring retained in a housing described in FIGS. 19 a-19 g and another with the spring retained in a shaft described in FIGS. 20 a-20 g.

Definitions

A definition of terms utilized in the present application is appropriate.

Definition of a radial canted coil spring. A radial canted coil spring has its compression force perpendicular or radial to the centerline of the arc or ring.

Definition of axial canted coil spring. An axial canted coil spring has its compression force parallel or axial to the centerline of the arc or ring.

The spring can also assume various angular geometries, varying from 0 to 90 degrees and can assume a concave or a convex position in relation to the centerline of the spring.

Definition of concave and convex. For the purpose of this patent application, concave and convex are defined as follows:

The position that a canted coil spring assumes when a radial or axial spring is assembled into a housing and positioned by—passing a piston through the ID so that the ID is forward of the centerline is in a convex position.

When the spring is assembled into the piston, upon passing the piston through a housing, the spring is positioned by the housing so that the OD of the spring is behind the centerline of the spring is in a convex position.

The spring-rings can also be extended for insertion into the groove or compressed into the groove. Extension of the spring consists of making the spring ID larger by stretching or gartering the ID of the spring to assume a new position when assembled into a groove or the spring can also be made larger than the groove cavity diameter and then compressed the groove.

Canted coil springs are available in radial and axial applications. Generally, a radial spring is assembled so that it is loaded radially. An axial spring is generally assembled into a cavity so that the radial force is applied along the major axis of the coil, while the coils are compressed axially and deflect axially along the minor axis of the coil.

Radial springs. Radial springs can have the coils canting counterclockwise (FIG. 19 a, row 2, column 13) or clockwise (FIG. 19 a, row 3, column 13). When the coils cant counterclockwise, the front angle is in the front (row 2, column 13). When the coils cant clockwise (FIG. 19 a, row 3, column 13), the back angle is in the front. Upon inserting a pin or shaft through the inside diameter of the spring with the spring mounted in the housing in a counterclockwise position (FIG. 19 a, row 2, columns 2, 3, 5), the shaft will come in contact with the front angle of the coil and the force developed during insertion will be less than when compressing the back angle from a spring in a clockwise position. The degree of insertion force will vary depending on various factors. The running force will be about the same (FIG. 19 a, row 2, columns 6, 8).

RUNNING FORCE. Running force is the frictional force that is produced when a constant diameter portion of the pin is passed through the spring.

Axial springs may also be assembled into a cavity whose groove width is smaller than the coil height (FIG. 19 a, row 5, columns 2, 3, 5, 6, 7 and 8). Assembly can be done by inserting spring (FIG. 19 a, row 5, column 13) into the cavity or by taking the radial spring (FIG. 19 a, row 7, column 13) and turning the spring coils clockwise 90.degree. into a clockwise axial spring (FIG. 19 a, row 7, column 15) and inserting into the cavity. Under such conditions, the spring will assume an axial position, provided the groove width is smaller than the coil height. Under such conditions, the insertion and running force will be slightly higher than when an axial spring is assembled into the same cavity. The reason is that upon turning the radial spring at assembly, a higher radial force is created, requiring a higher insertion and running force.

Axial springs RF and F definition. Axial springs can be RF (FIG. 19 a, row 5, column 13) with the coils canting clockwise or they can be F (FIG. 19 a, row 6, column 13) with the coils canting counterclockwise. An RF spring is defined as one in which the spring ring has the back angle at the ID of the coils (FIG. 19 a, row 5, column 12) with the front angle on the OD of the coils. An F spring (FIG. 19 a, row 6, column 13) has the back angle on the OD and the front angle at the ID of the coils.

Turn angle springs are shown in FIG. 19 e, row 10, column 13, FIG. 19 f, rows 2-5, column 13. The springs can be made with turn angles between 0 and 90 degrees. This spring can have a concave direction (FIG. 19 a, row 5, column 6) or a convex direction (FIG. 19 a, row 5, column 8) when assembled into the cavity, depending on the direction in which the pin is inserted. This will affect the insertion and running force.

F type axial springs always develop higher insertion and running forces than RF springs. The reason is that in an F spring the back angle is always located at the OD of the spring, which produces higher forces.

Definition of Point of Contact. The point of load where the force is applied on the coil during unlatching or disconnecting of the two mating parts. (FIG. 19 a, row 2, column 11, row 5, column 11).

Definition of "end of the major axis of the coil." The point at the end of the major axis of the coil. (FIG. 19 a, row 2, column 2 and row 5, column 2).

Types of grooves that may be used.

Flat groove. (FIG. 19 a, row 2, column 4) The simplest type of groove is one that has a flat groove with the groove width larger than the coil width of the spring. In such case, the force is applied radially.

'V' bottom groove. (FIG. 19 a, row 4, column 4) This type of groove retains the spring better in the cavity by reducing axial movement and increasing the points of contact. This enhances electrical conductivity and reduces the variability of the conductivity. The groove width is larger than the coil width. The spring force is applied radially.

Grooves for axial springs. (FIG. 19 a, row 5, column 2) Grooves for axial springs are designed to better retain the spring at assembly. In such cases, the groove width is smaller than the coil height. At assembly, the spring is compressed along the minor axis axially and upon the insertion of a pin or shaft through the ID of the spring the spring, the coils deflect along the minor axis axially.

There are variations of these grooves from a flat bottom groove to a tapered bottom groove.

Axial springs using flat bottom groove. In such cases, the degree of deflection available on the spring is reduced compared to a radial spring, depending on the interference that occurs between the coil height and the groove width.

The greater the interference between the spring coil height and the groove, the higher the force to deflect the coils and the higher the insertion and running forces.

In such cases, the spring is loaded radially upon passing a pin through the ID. The deflection occurs by turning the spring angularly in the direction of movement of the pin. An excessive amount of radial force may cause permanent damage to the spring because the spring coils have "no place to go" and butts.

Axial springs with grooves with a tapered bottom. (FIG. 19 b, rows 7-9, column 2 through FIG. 19 c, rows 2-7, column 2) A tapered bottom groove has the advantage that the spring deflects gradually compared to a flat bottom groove. When a pin is passed through the ID of the spring, it will deflect in the direction of motion. The running force depends on the direction of the pin and the type of spring. Lower forces will occur when the pin moves in a concave spring direction (FIG. 19 b, row 5, column 6) and higher force when the pin moves in a convex spring direction (FIG. 19 b, row 5, column 8).

Tapered bottom grooves have the advantage that the spring has a substantial degree of deflection, which occurs by compressing the spring radially, thus allowing for a greater degree of tolerance variation while remaining functional as compared to flat bottom grooves.

Mounting of groove. Grooves can be mounted in the piston or in the housing, depending on the application. Piston mounted grooves are described in FIGS. 20 a-20 g.

Expansion and contracting of springs. A radial spring ring can be expanded from a small inside diameter to a larger inside diameter and can also be compressed from a larger OD to a smaller OD by crowding the OD of the spring into the same cavity. When expanding a spring the back angle and front angles of the spring coils decrease, thus increasing the connecting and running forces. When compressing a radial spring OD into a cavity, which is smaller than the OD of the spring, the coils are deflected radially, causing the back and front angles to increase. The increase of these angles reduces the insertion and running forces when passing a pin through the ID of the spring.

Figure 9D:
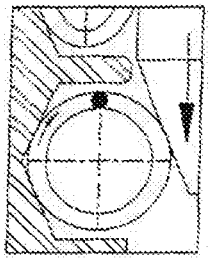

The following patents and patent application are to be incorporated in this patent application as follows: [0073] 1) U.S. Pat. No. 4,893,795 sheet 2 FIGS. 4, 5A, 5B, 5C, 5D, 5E, 6A and 6B; [0074] 2) U.S. Pat. No. 4,876,781 sheet 2 and sheet 3 FIGS. 5A, 5B, and FIG. 6. [0075] 3) U.S. Pat. No. 4,974,821 page 3 FIGS. 8 and 9 [0076] 4) U.S. Pat. No. 5,108,078 sheet 1 FIGS. 1 through 6 [0077] 5) U.S. Pat. No. 5,139,243 page 1 and 2 FIGS. 1A, 1B, 2A, 2B and also FIGS. 4A, 4B, 5A, and 5E [0078] 6) U.S. Pat. No. 5,139,276 sheet 3 FIGS. 10A, 10B, 10C, 11A, 11B, 12A, 12B, 12C, 13A, 13B, and 14 [0079] 7) U.S. Pat. No. 5,082,390 sheet 2 and 3, FIGS. 4A, 4B, 5A, 5B, 6A, 6B, 7A, 7C, 8A, 8B [0080] 8) U.S. Pat. No. 5,091,606 sheets 11, 12, and 14. FIGS. 42, 43, 44, 45, 46, 47, 48, 48A, 48B, 49, 50A, 50B, 50C, 51A, 51B, 51C, 58A, 58B, 58C, 58D. [0081] 9) U.S. Pat. No. 5,545,842 sheets 1, 2, 3, and 5. FIGS. 1, 4, 6, 9, 13, 14, 19, 26A, 26B, 27A, 27B, 28A, 28B. [0082] 10) U.S. Pat. No. 5,411,348 sheets 2, 3, 4, 5, and 6. FIGS. 5A, 5C, 6A, 6C, 7A, 7C, 7D, 8A, 8B, 8C, 9A, 9C, 10C, 11, 12 and 17. [0083] 11) U.S. Pat. No. 5,615,870 Sheets 1-15, Sheets 17-23 with FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 66, 67, 68, 69, 70, 71, 72, 73, 74, 75, 76, 77, 78, 79, 80, 81, 82, 83, 84, 85, 86, 87, 88, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 123, 124, 125, 126, 127, 128, 129, 130, 131, 132, 133, 134, 135. [0084] 12) U.S. Pat. No. 5,791,638 Sheets 1, 2, 3, 4, 5, 6, 7, 8, 9, 10, 11, 12, 13, 14, 15, 17, 18, 19, 20, 21, 22, 23. FIGS. 1-61 and 66-88 and 92-135. [0085] 13) U.S. Pat. No. 5,709,371, page 1, 2, 3, 4, 5, 6, 7, 8, 9, 10, 11, 12, 13, 14, 15, 17, 18, 19, 20, 21, 22, 23. FIGS. 1-61 and 66-88 and 92-135. [0086] 14) Application for patent by Balsells entitled "Spring Holding Connectors" Customer Ser. No. 10/777,974 filed Feb. 12, 2004.

In general, FIGS. 19 a-19 g illustrate housing mounted designs for holding and other applications. These FIGS. show 53 different types of grooves and spring geometries in which the spring is mounted in the housing, using different spring configurations and different groove variations, which result in different insertion and running forces.

FIG. 19 a, row 2, columns 2-12 show a flat bottom groove with a radial spring.

FIG. 19 a, row 2, column 2 shows an assembly with a spring mounted in a housing with a shaft moving forward axially.

FIG. 19 a, row 2, column 3 shows the assembly in a latched position.

FIG. 19 a, row 2, column 4 shows schematic of a flat bottom groove.

Figure 19A:
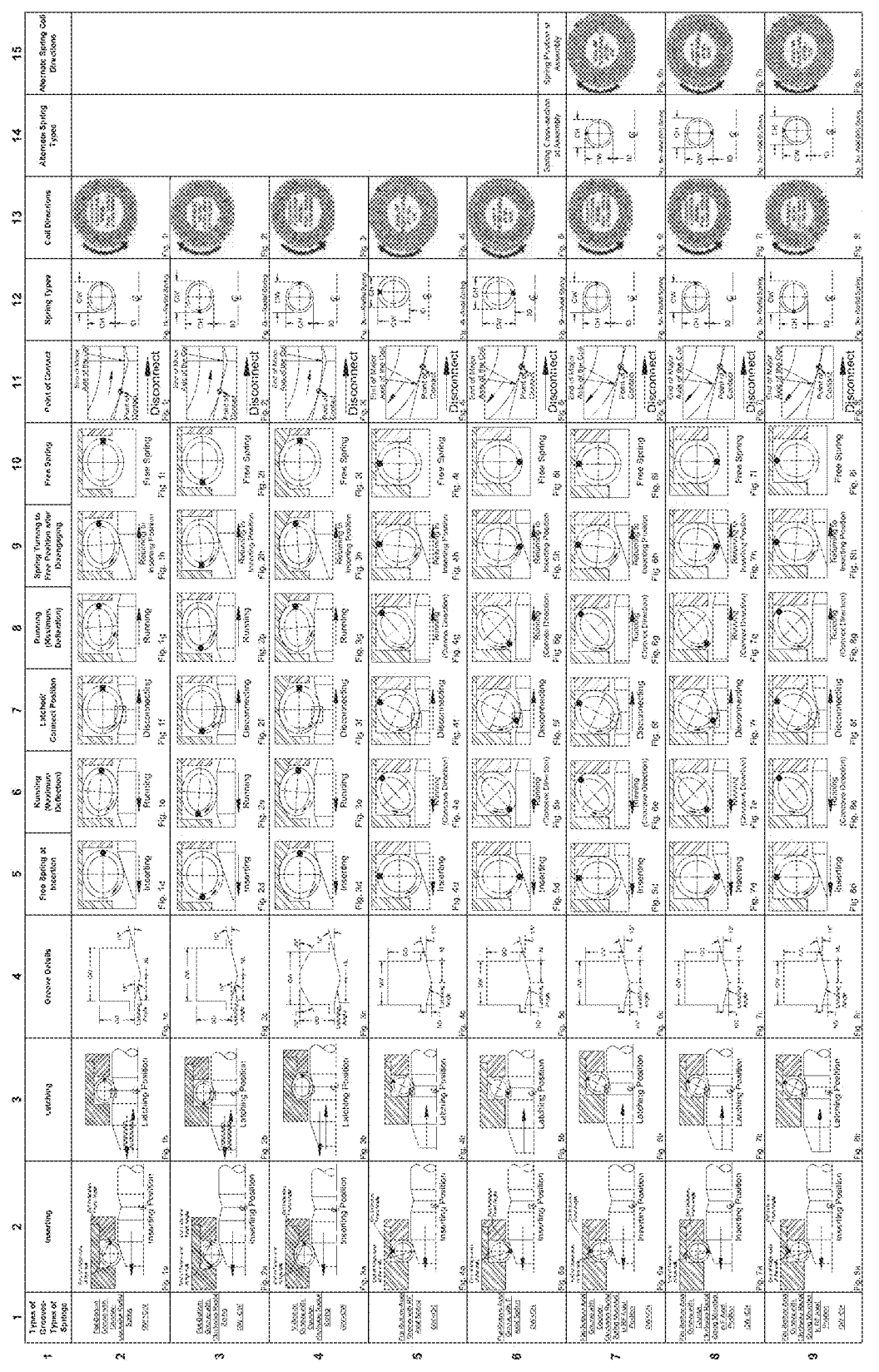
Figure 19B:
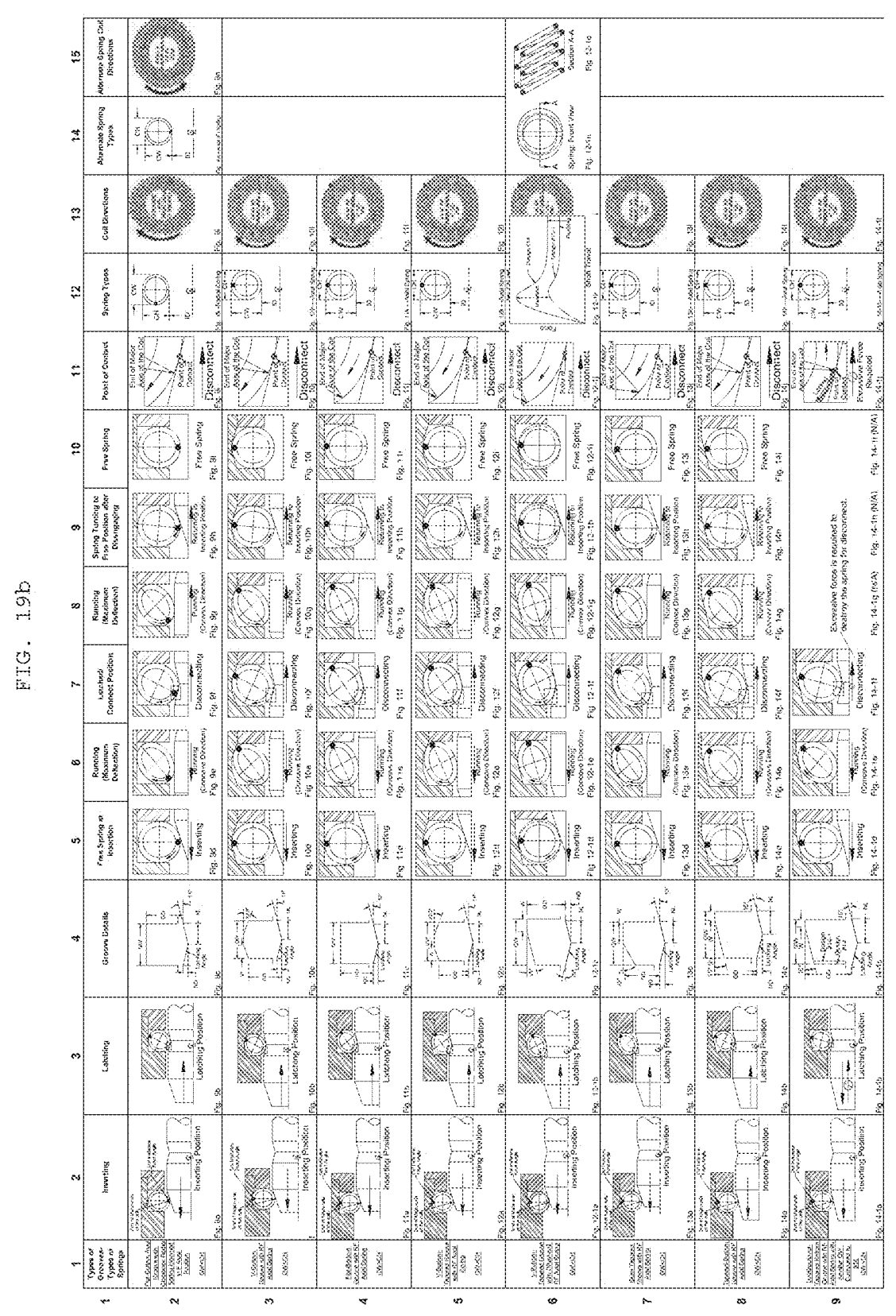
Figure 19C:
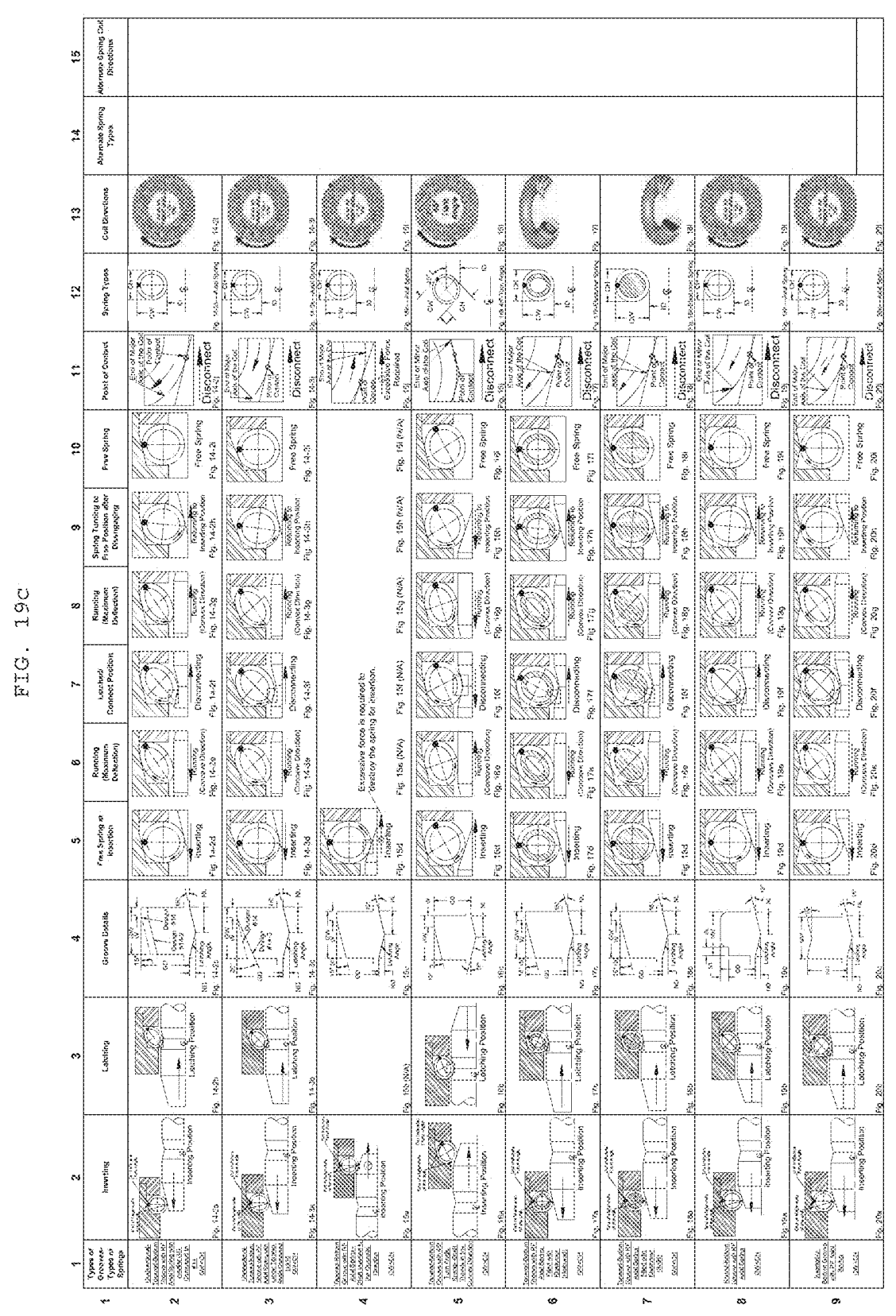
Figure 19D:
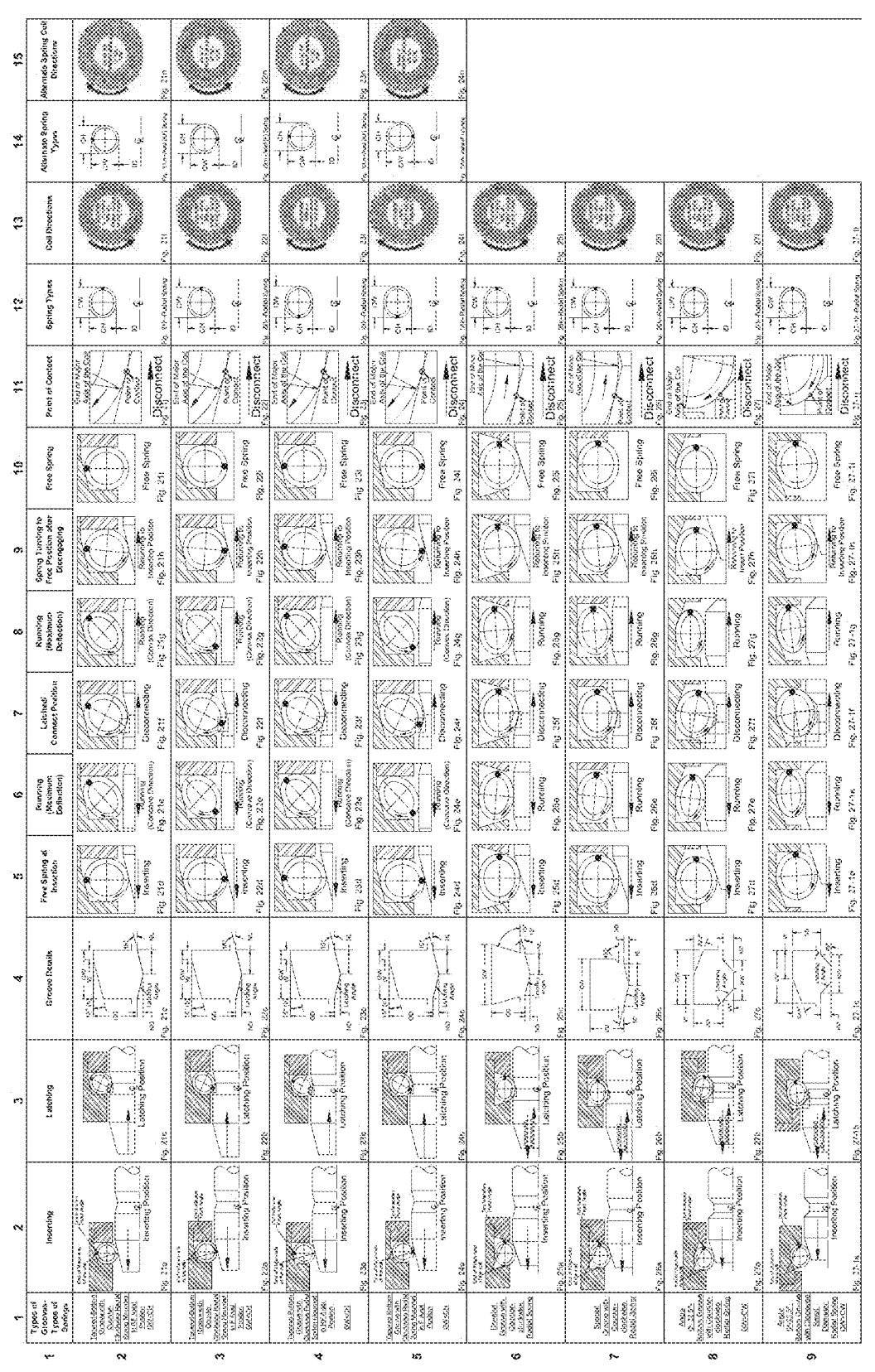
Figure 19E:
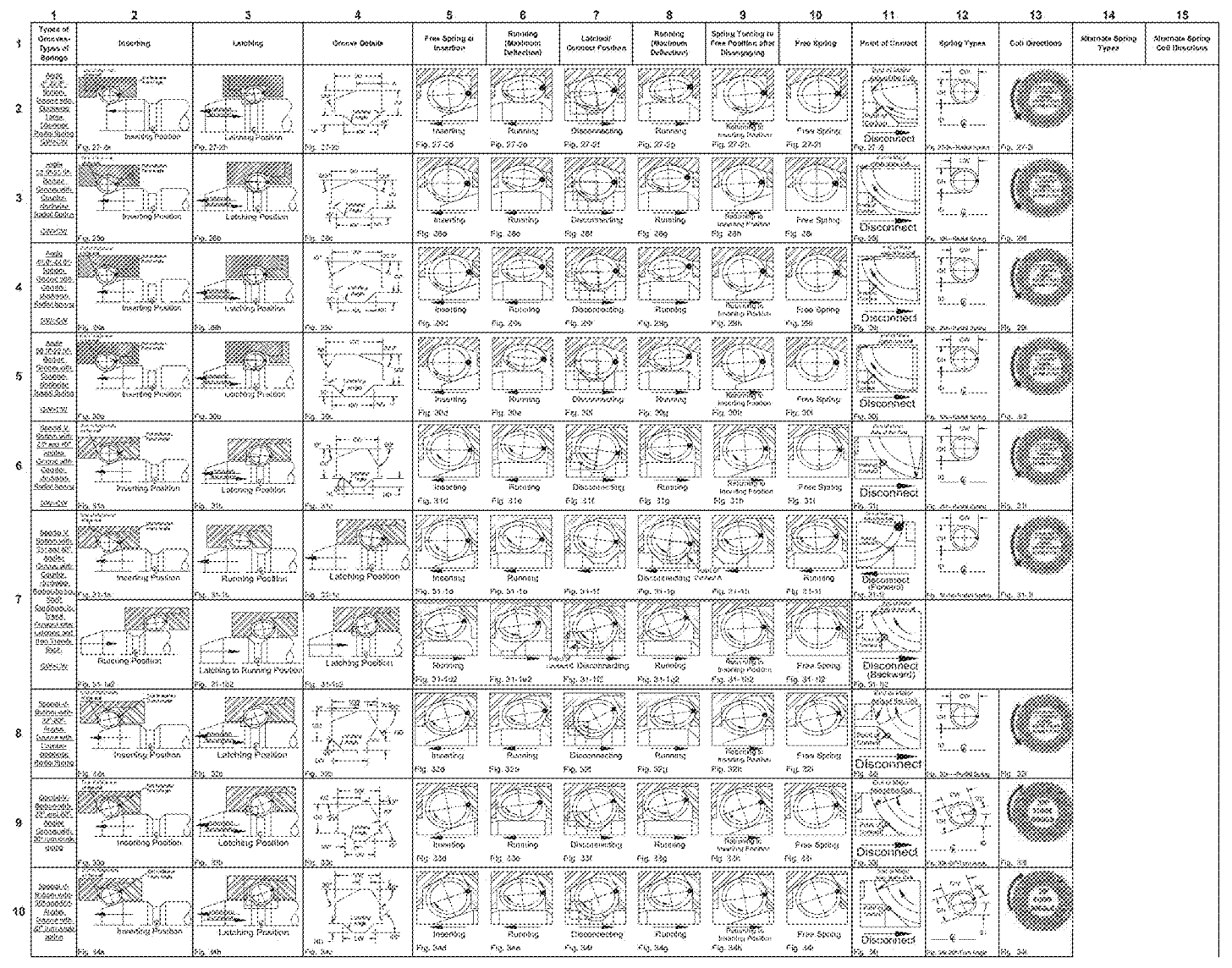
Figure 19F:
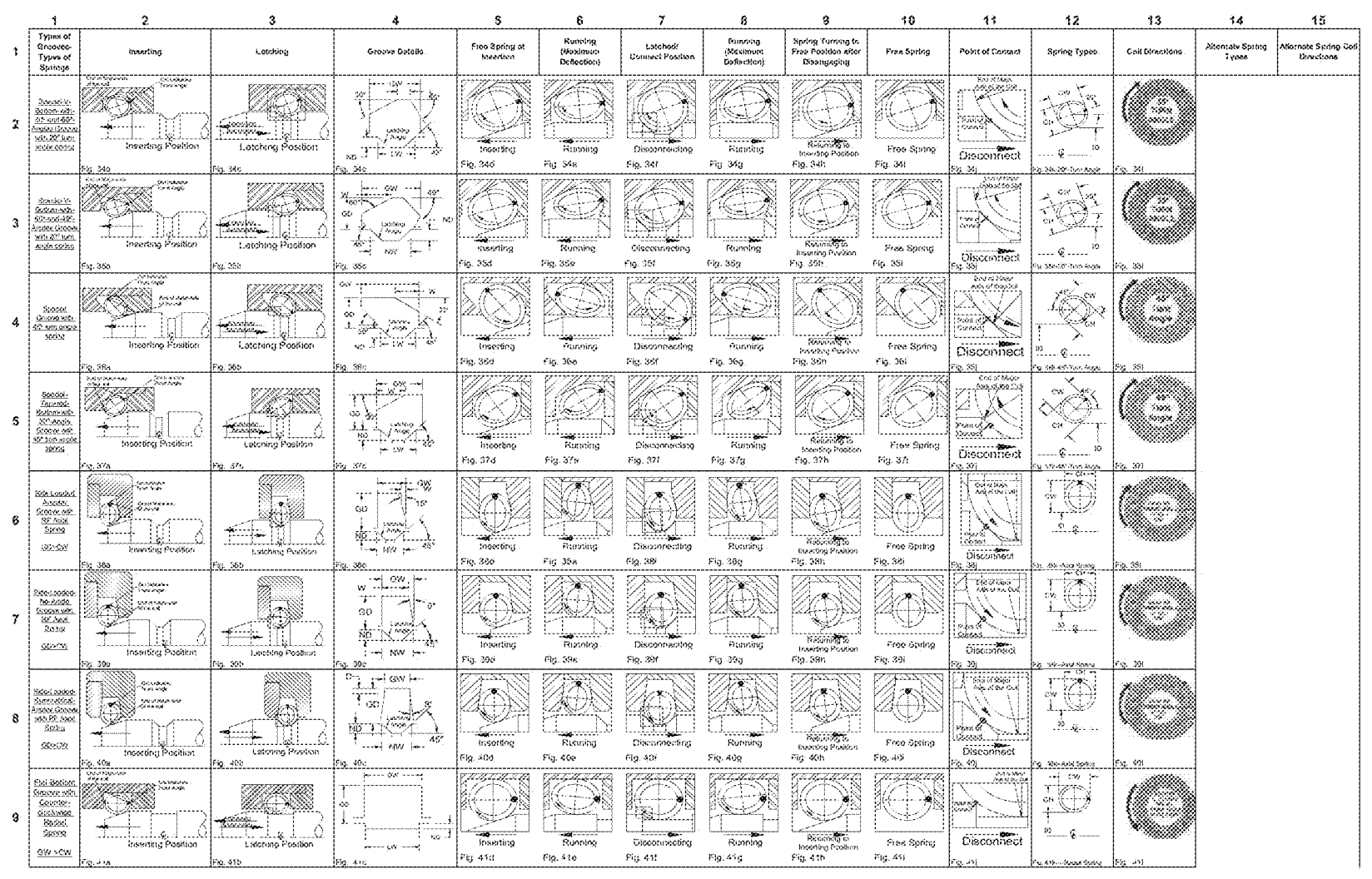
Figure 19G:
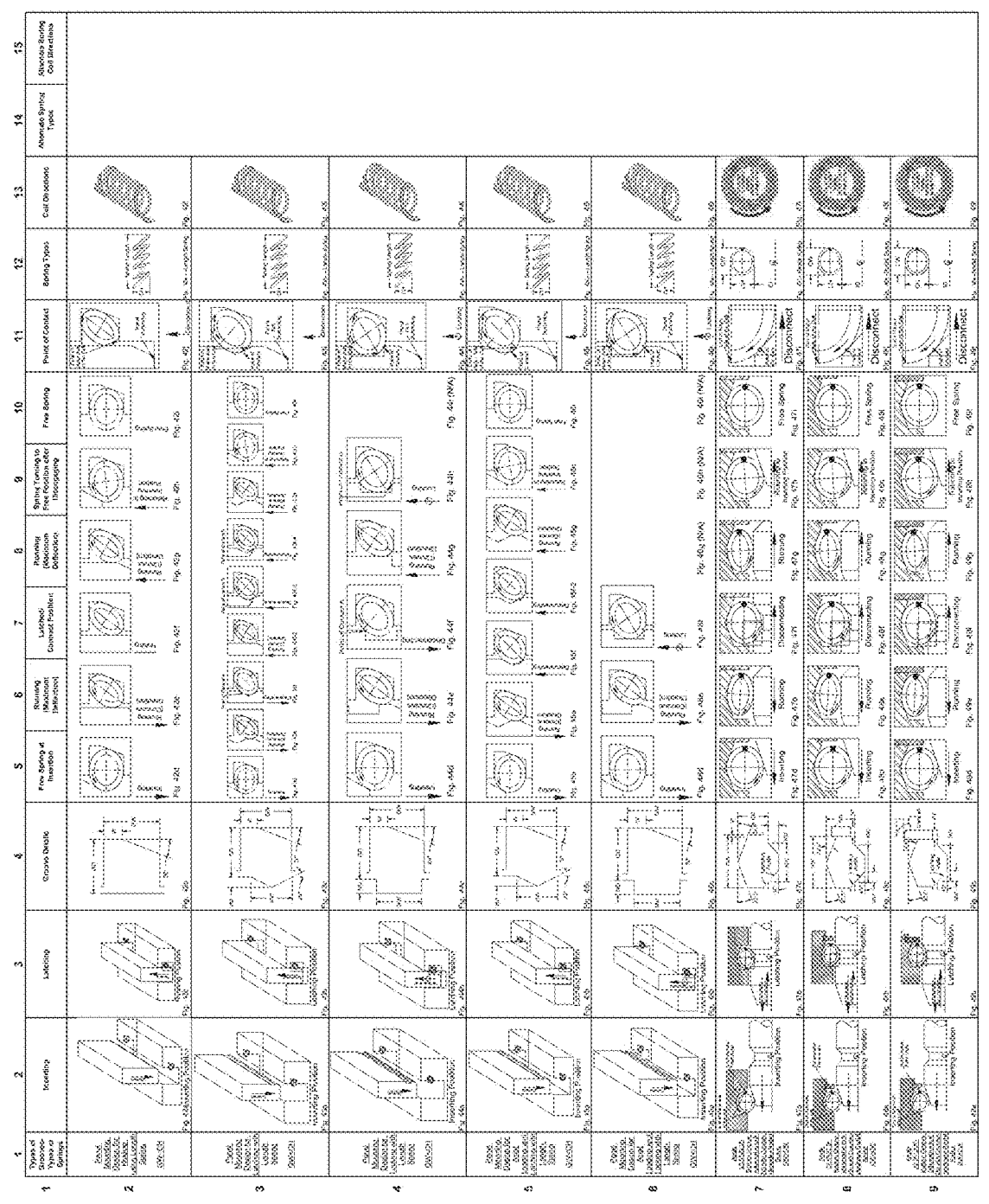

FIG. 19 a, row 2, column 5 shows and enlarged portion of FIG. 19A, row 2, column 2.

FIG. 19 a, row 2, column 6 shows the assembly in a hold running connect direction FIG. 19 a, row 2, column 7 shows an enlarged portion of FIG. 19 a, row 2, column 3 in a latch position.

FIG. 19 a, row 2, column 8 shows the assembly in a hold running disconnect direction.

FIG. 19 a, row 2, column 9 shows the assembly returning to the inserting position.

FIG. 19 a, row 2, column 10 shows an enlarged view of the point of contact between the coils and the shaft.

FIG. 19 a, row 2, column 11 shows an enlarged view of FIG. 19 a, row 2, column 3.

FIG. 19 a, row 2, column 12 shows a cross section of the radial spring with the dot indicating the front angle.

FIG. 19 a, row 2, column 13 shows the spring in a free position and shows a front view of the canted coil counterclockwise radial spring with the front angle in front.

FIG. 19 a, row 3, columns 2-12 show a spring mounted 180.degree. from that shows in FIG. 19 a, row 2 in a clockwise position.

FIG. 19 a, row 4, columns 1-12 show a V-bottom groove with a counterclockwise radial spring.

FIG. 19 a, row 5, columns 1-12 show a flat bottom axial groove with an RF axial spring. The groove width is smaller than the coil height and the point of contact is closer to the centerline of the major axis of the spring coil. The closer the point of contact is to the point at the end of the major axis of the coil, the higher the force required to disconnect in a convex direction. (FIG. 19 a, row 5, columns 7-8).

FIG. 19 a, row 6, columns 2-12 show a flat bottom groove with an F axial spring. The groove width is smaller than the coil height.

FIG. 19 a, rows 7-8 and FIG. 19 b, row 9 show a radial spring turned into an axial spring by assembling this spring into a cavity in an axial position.

More specifically, FIG. 19 a, row 6 shows a flat bottom axial groove with counterclockwise radial spring mounted in an RF axial position. The groove width is smaller than the coil height.

FIG. 19 a, row 8 is a flat bottom groove with a counterclockwise radial spring mounted in an F axial position.

FIG. 19 a, row 9 is a flat bottom groove with a clockwise radial spring mounted in an RF axial position. The groove width smaller than the coil height, and FIG. 19 b, row 2 shows a flat bottom axial groove with clockwise radial spring mounted in F axial position. Groove width smaller than the coil height.

FIG. 19 b, row 3 shows a V bottom groove with an RF axial spring. The groove width is smaller than the coil height.

FIG. 19 b, row 4 shows a flat bottom groove with an RF axial spring with a groove width larger than the coil height. Making the groove width larger than the coil heights allows the point of contact to move further away from the point at the end of the major axis of the coil at disconnect thus decreasing the force.

FIG. 19 b, row 5 shows a V bottom flat groove with RF axial spring. The groove width is larger than the coil height. (GW>CH)

FIG. 19 b, row 6 shows a design like FIG. 19 b, row 5, except that the RF axial spring has offset coils that fit into the groove. The offset coils allow partial contact holding within the groove at different intervals along the groove diameter walls, and the coils are deflected axially at different points of the groove on both sides sufficiently to retain the spring in place. The offset coils increase the total axial coil height, which helps retain the spring inside the groove. The insertion and running forces are also reduced compared to FIG. 19 b, row 5 where the groove width is smaller than the coil height. The difference in force is illustrated in FIG. 19 b, row 6, column 12, where force versus shaft travel distance is shown illustrating the force developed.

FIG. 19 b, row 6, column 13 and 14 shows the offset coils in a free position.

FIG. 19 b, row 6, column 11 shows the point of contact in relation to the point at the end of the major axis of the coils with the point of contact further away from the major axis of the coil thus decreasing the force required to disconnect. This can be compared with FIG. 19 b, row 8, column 11 whereby the point of contact is closer to the point at the end of the major axis of the coil, thus requiring a substantially higher force to disconnect.

FIG. 19 b, row 7 shows an axial RF spring with a tapered bottom groove that positions the point of contact (FIG. 19 b, row 7, column 11) closer to the end point at the end of the major axis of the coil than in FIG. 19 b, row 6, column 11, thus requiring a greater force to disconnect.

FIG. 19 b, row 8 shows a tapered bottom groove of a different configuration but similar to FIG. 19 b, row 7 with an RF axial spring with a groove width smaller than the coil height. The groove configuration positions the point of contact closer to the end point at the end of the major axis of the coil. An axial RF spring is used in this design.

FIG. 19 b, row 9 shows a tapered bottom groove with RF axial spring with a groove width smaller than the coil height. The point of contact is positioned at the end point of the major axis of the coil and disconnect is not possible as the force is applied along the major axis since the spring will not compress along that axis.

FIG. 19 c, row 2 shows a tapered bottom groove with an axial spring mounted in the groove. The position of the spring is such that the centerline along the minor axis is slightly above the bore, which results in less deflection of the spring, thus positioning the point of contact further away from the end point of the major axis of the coil, resulting in a lower disconnect force.

FIG. 19 c, row 3 shows a tapered bottom groove with an axial spring mounted in the groove. The groove is shown with a 25-degree angle. By increasing the angle, the distance from the end of the major axis of the coil to the point of contact increases (FIG. 19 c, row 3, column 11 compared to FIG. 19 b, row 8, column 11), resulting in lower connect and disconnect forces. On the other hand, decreasing the taper angle will bring the point of contact closer to the end of the major axis of the coil, resulting in higher connect and disconnect forces. Increasing the groove angle will increase the spring deflection which will increase the running force.

FIG. 19 c, row 4 shows a tapered bottom groove with an RF axial spring with the shaft inserted in the opposite direction. The groove width is smaller than the coil height. In this case, again, the point of contact at the point at the end of the major axis of the coil and no deflection exists and a disconnect is not possible.

Insertion force in this direction will cause the spring coil to turn counter clockwise thus applying a force along the major axis of the coil and the spring will not deflect along the major axis causing damage to the spring.

FIG. 19 c, row 5 shows a tapered bottom groove with 45.degree. turn angle spring with the shaft inserted in the convex direction. The groove width is smaller than the coil width. The angular spring deflects axially.

FIG. 19 c, row 6 shows a tapered bottom groove with an RF axial spring filled with an elastomer with a hollow center. The groove width is smaller than the coil height (GW<CH).

FIG. 19 c, row 7 Shows a tapered bottom groove with an RF axial spring filled with an elastomer solid, as in FIG. 19 c, row 6 with the groove width smaller than the coil height (GW<CH).

FIG. 19 c, row 8 shows a step round flat bottom groove with an RF axial spring groove with the width smaller than the coil height. This design has a groove with a point of contact that scrapes the wire as the coil moves, removing oxides that may be formed on the surface of the wire. The groove has been designed to provide a lower force at disconnect by increasing the distance between the point of contact and the point at the end of the major axis of the coil.

FIG. 19 c, row 9 shows an inverted V bottom groove with RF axial spring. The groove width is smaller than the coil height.

FIG. 19 d, row 2 shows a tapered bottom groove with a counterclockwise radial spring mounted in a RF position. The groove width is smaller than the coil height. Notice the position of the point of contact with respect to the end point at the end of the major axis of the coil. The closer the point of contact to the end point at the end of the major axis of the coil the higher the force required to disconnect.

FIG. 19 d, row 3 shows a tapered bottom groove with a counterclockwise radial spring mounted in an F axial position. The groove width is smaller than the coil height.

FIG. 19 d, row 4 shows a tapered bottom groove with a clockwise radial spring mounted in an RF axial position. The groove width is smaller than the coil height.

FIG. 19 d, row 5 shows a tapered bottom groove with a clockwise radial spring mounted in an F axial position. The groove width is smaller than the coil height.

FIG. 19 d, row 6 shows a dovetail groove with a counterclockwise radial spring.

FIG. 19 d, row 7 shows a special groove with a counterclockwise radial spring.

FIG. 19 d, row 8 shows an angle of zero to 221/2 degrees flat and tapered bottom groove with a counterclockwise radial spring. The groove width is greater than the coil width. The spring in latching will turn clockwise positioning the coil to reduce the force required to disconnect by positioning the point of contact further away from the end of the end point at the end of the major axis of the coil.

FIG. 19 d, row 9 shows an angle of 0 to 221/2 degrees. The piston groove has a flat and a tapered bottom with a clockwise spring. The spring has an ID to coil height ratio smaller than 4. Under load, this spring has a higher torsional force that requires a higher force to connect or disconnect the shaft. Upon latching, the spring turns clockwise, moving the point of contact closer to the end of the major axis of the coil (FIG. 19 d, row 9, column 7 and FIG. 19 d, row 9, column 11) thus increasing the force to disconnect.

FIG. 19 e, row 2 is like FIG. 19 d, row 9 except that in this case, the spring groove has an ID to coil height ratio greater than 4, thus the radial force applied to the spring at connect or disconnect is substantially lower. As the ratio of the ID of the spring to the coil height increases, the force required to connect or disconnect decreases due to a lower radial force.

FIG. 19 e, row 3 has an angle groove with a 0.degree. to 22.5.degree. piston groove angle similar to FIG. 3 except that the piston groove has a 'V' bottom groove instead of a 'V' bottom groove with a flat. The housing has a 'V' bottom groove with a flat at the bottom of the groove. This design permits for specific load points at connect-latched position.

FIG. 19 e, row 4 shows a groove angle 30.degree./22 1/2.degree. bottom groove with a counterclockwise radial spring. The groove width is greater than the coil width. By changing the groove angle, the distance between the point of contact and the point at the end of the major axis of the coil is increased, reducing the force at disconnect.

FIG. 19 e, row 5 shows an angle 60.degree./22 1/2.degree. bottom groove with a counterclockwise radial spring. The groove width is greater than the coil width.

FIG. 19 e, row 6 shows a special V type bottom with a 23.degree. and 60.degree. angle with a counterclockwise radial spring. The groove width greater than the coil width.

FIG. 19 e, row 7 shows a V type bottom groove with 23.degree. and 60.degree. angles like FIG. 19 e, row 6 with a counterclockwise radial spring. The groove width is greater than the coil width. By moving the shaft forward and then back it causes the spring to turn so the point of contact is closer to the point at the end of the major axis of the coil, increasing the force required to disconnect. When the direction of latching is reversed, the piston is traveling in the direction of the back angle in FIG. 19 e, row 8, column 2, as opposed to traveling in the direction of the front angle in FIG. 19 e, row 7, column 2. The increased force increases the turning of the spring, thus increasing the distance between the point of contact and the end point of the major axis, decreasing the force required to disconnect or unlatch. Compare FIG. 19 e, row 7, column 8 showing the piston moving forward and the position of the point of contact 'A' with the position of the point of contact FIG. 19 e, row 7, column 7.

FIG. 19 e, row 9 shows a special V bottom type groove with 22.degree. and 60.degree. angles with a radial spring. The contact point is close to the point at the end of the major axis of the coil for a high disconnect force.

FIG. 19 e, row 10 through FIG. 19 f, row 5 show turn angle springs, assembled in different groove designs. Notice the point of contact position in relation to the POINT AT THE END OF THE major axis of the coil.

More specifically, FIG. 19 e, row 10 shows a special V-bottom with 23.degree. and 60.degree. angles with a 20.degree. turn angle spring.

FIG. 19 f, row 2 shows a special V-bottom with 30.degree. and 60.degree. angles with a 20.degree. turn angle spring.

FIG. 19 f, row 3 shows a special V-bottom with 60.degree. and 49.degree. angles with a 20.degree. turn angle spring.

FIG. 19 f, row 4 shows a special groove with a 45.degree. turn angle spring. In this case, the point of contact is closer to the point at the end of the minor axis of the coil. Upon insertion, the pin will cause the spring to expand radially and causing the coil to deflect along the minor axis and causing the spring coils to turn counterclockwise to connect. At disconnect the spring coils will deflect along the minor axis and the coils will continue to turn counterclockwise to disconnect. The spring coils will turn clockwise to its original position when the force acting on the spring is released.

FIG. 19 f, row 5 shows a special tapered groove with a 30.degree. angle with a 45.degree. angle at the piston groove. Notice the point of contact in relation to the point at the end of the major axis of the coil.

FIG. 19 f, rows 6-8 show an axial spring mounted in a tapered bottom groove.

More specifically, FIG. 19 f, row 6 shows an angular groove with an RF axial spring with a groove depth greater than the coil width. Notice the position of the point of contact at disconnect with the coil diameter expands radially permitting disconnect.

FIG. 19 f, row 7 shows a groove similar to FIG. 38, but with a tapered angle on one side of the groove.

FIG. 19 f, row 8 shows a symmetrical angle groove with an RF axial spring. The groove depth is greater than the coil width.

FIG. 19 f, row 9 shows a flat bottom-housing groove with a counterclockwise radial spring. The groove width is greater than the coil height. In this case, the piston has a step groove.

FIG. 19 g, rows 2-6 show various methods of mounting a panel on a housing, using a length of spring whose groove can be mounted on the housing or on the panel and such groove has a groove width smaller than the coil height so that the spring can be retained in such groove.

FIG. 19 g, row 2 shows a panel-mounted design with length of spring with axial loading and holding.

FIG. 19 g, row 2, column 2 shows the panel in an inserting position. FIG. 19 g, row 2, column 3 shows the panel in a connected position. FIG. 19 g, row 2, column 4 shows a schematic of the groove design. FIG. 19 g, row 2, column 5 shows the spring being inserted into the cavity. FIG. 19 g, row 2, column 7 shows the spring in a holding position. FIG. 19 g, row 2, column 11 shows an enlarged view of FIG. 19 g, row 2, column 7.

FIG. 19 g, row 3 shows a panel mounting design with length of spring with some axial loading and latching, using a flat tapered groove. The groove width is smaller than the coil height. This particular design will permit axial movement of the panel. FIG. 19 g, row 2, column 3 shows the design in a latch position, which can permit axial movement. FIG. 19 g, row 3, column 8 shows an enlarged view of the latch position. FIG. 19 g, row 3, column 5 shows the point in contact in relation to the end major axis of the coil.

FIG. 19 g, row 4 shows a panel mounting design with length of spring with latching, which will permit axial movement of the panel and locking, using a rectangular groove on the panel with the groove width smaller than the coil height.

FIG. 19 g, row 4, column 3 shows the design in a latch axial position, permitting some axial movement. FIG. 19 g, row 4, column 5 shows an enlarged view of the latch position. FIG. 19 g, row 4, column 9 shows a latch locked position to disconnect. FIG. 19 g, row 4, column 11 shows an enlarged view of the point of contact with end of major axis of the coil at locking.

FIG. 19 g, row 5 shows a panel mounting with length of spring with axial loading and latching. Groove width smaller than the coil height.

FIG. 19 g, row 5, column 2 shows the panel in an inserting position and FIG. 19 g, row 5, column 3 in a latched position with the spring retained in the groove mounted in the housing with the grooves offset from each other. The grooves are offset to provide axial loading in the latched position. In this case, the panel has a V-groove design. Notice the axially loaded position of the spring to prevent axial movement when in a connected-latched position.

FIG. 19 g, row 6 shows a panel assembly similar to FIG. 19 g, row 5 except that the panel has a step flat bottom groove instead of a V-bottom type groove and the housing has a flat tapered bottom groove and it is axially loaded in the connect position. Disconnect in the axial position will not be possible because as the panel is pulled it causes the spring to turn, applying the disconnect component force at the end of the major axis of the coil where no deflection occurs.

The descriptions illustrated in FIG. 19 g, rows 2-6 show the holding, latching, and locking in the axial position. Separation of the panel from the housing can be done by sliding the panel longitudinally.

These designs indicated in FIG. 19 g, rows 2-6 show a panel-mounted design; however, the design could also be applicable to other designs, such as cylindrical, rectangular, elliptical or other types of surfaces. All designs are shown with GW<CH; however the groove could be made wider to be GW<CH with lower connect-disconnect force.

FIG. 19 g, rows 7-9 are similar to FIG. 19 e, row 3, show different methods of retaining the spring in the cavity.

FIG. 19 g, row 7 shows a rectangular washer retaining the spring in position.

FIG. 19 g, row 8 shows a snap ring retaining the spring in position.

FIG. 19 g, row 9 shows a washer retained in position by rolling over a portion of the housing on to the washer housing to form the retaining groove.

The designs are shown with specific dimensions, angles and groove configurations. These values can be changed to other angles and groove configurations while achieving the results indicated.

Piston Mounted Designs for Latching Applications.

FIGS. 20 a-20 g show various designs with the spring mounted in the piston in latching applications. In essence, these applications are similar to the ones that are described in FIGS. 19 a-19 g except that the spring is mounted in the piston and it encompasses 48 variations of groove designs.

FIG. 20 a, row 2 shows a flat bottom groove with counterclockwise radial spring with a groove width greater than the coil width. FIG. 20 a, columns 2-9, show different assemblies of the spring and grooves and the spring in various positions.

FIG. 20 a, row 2, column 2 shows the assembly in an insert position.

FIG. 20 a, row 2, column 3 shows the assembly in a latch position.

FIG. 20 a, row 2, column 4 shows the cross section of the flat bottom groove.

FIG. 20 a, row 2, column 5 shows an enlarged view of FIG. 20 a, row 2, column 2.

FIG. 20 a, row 2, column 6 shows the position of the spring in a hold-RUNNING position with the spring deflected along the minor axis.

FIG. 20 a, row 2, column 7 shows an enlarged position of FIG. 20 a, row 2, column 3 in a latched-connect position moving in a disconnect direction relative to the end point of the major axis.

FIG. 20 a, row 2, column 8 shows the assembly in hold-disconnect direction.

FIG. 20 a, row 2, column 9 shows the assembly returning to the inserting position.

FIG. 20 a, row 2, column 10 shows the spring in a free position.

FIG. 20 a, row 2, column 11 shows a partial enlarged view of FIG. 20 a, row 2, column 7.

FIG. 20 a, row 2, column 12 shows a cross sectional view of the spring showing the position of the front angle.

FIG. 20 a, row 2, column 13 shows a front view of the spring in a counterclockwise with the radial spring front angle in the front.

FIG. 20 a, row 3 is the same position as FIG. 20 a, row 2 except that the spring has been turned around 180.degree.

FIG. 20 a, row 4 shows a V-bottom groove with a counterclockwise radial spring with a groove width greater than the coil width.

FIG. 20 a, row 5 shows a flat bottom axial groove with an RF axial spring. The groove width is smaller than the coil height. The point of contact is close to the end point of the major axis of the coil, requiring a high force to disconnect.

FIG. 20 a, row 6 shows a design as in FIG. 20 a, row 5 except it uses an F spring.

FIG. 20 a, rows 7-9 and FIG. 20 b, row 2 shows a radial spring turned into an axial spring, using a flat bottom groove.

FIG. 20 b, row 3 shows a V-bottom groove with an RF axial spring. The groove width is smaller than the coil height.

Table 2 b, row 4 shows a flat bottom groove with an RF axial spring. The groove width is greater than the coil height, thus resulting in lower disconnect force.

FIG. 20 b, row 5 shows a V-bottom tapered groove with an RF axial spring. The groove width is greater than the coil height.

FIG. 20 b, row 6 shows a design like FIG. 20 b, row 8, except that the RF axial spring has offset coils that fit into the groove. The offset coils allow partial contact holding within the groove at different intervals along the groove diameter walls, and the coils are deflected axially at different points of the groove on both sides sufficiently to retain the spring in place. The offset coils increase the total axial coil height, which helps retain the spring inside the groove. The insertion and running forces are also reduced compared to FIG. 20 b, row 8 where the groove width is smaller than the coil height. The difference in force is illustrated in FIG. 20 b, row 5, column 12, where we show force versus shaft travel distance, illustrating the force developed in FIG. 20 b, row 7 and in FIG. 20 b, row 6.

FIG. 20 b, row 6, column 12 shows a diagram Force vs. Shaft Travel Distance that compares the force developed by FIG. 20 b, row 7 vs. FIG. 20 b, row 6.

FIG. 20 b, row 6, columns 14-15 shows the offset coils in a free position.

FIG. 20 b, row 6, column 11 shows the point of contact in relation to the point at the end of the major axis of the coils with the point of contact further away from the end point of the major axis of the coil thus decreasing the force required to disconnect. This can be compared with FIG. 20 b, row 7, column 11 whereby the point of contact is closer to the end point of the major axis of the coil, thus requiring a substantially higher force to disconnect.

FIG. 20 b, row 7 shows an axial RF spring with a tapered bottom groove that positions the point of contact (FIG. 20 b, row 7, column 11) closer to the end point of the major axis of the coil than in FIG. 20 b, row 6, column 11, thus requiring a greater force to disconnect.

FIG. 20 b, row 8 shows a tapered bottom groove of a different configuration but similar to FIG. 20 b, row 7 with an RF axial spring with a groove width smaller than the coil height. The groove configuration positions the point of contact closer to the end point at the end of the major axis of the coil. An axial RF spring is used in this design.

FIG. 20 b, row 9 shows a tapered bottom groove with RF axial spring with a groove width smaller than the coil height. The end point of contact is positioned at the point of contact at the end point of the major axis of the coil and disconnect is not possible as the force is applied along the major axis since the spring will not compress along that axis.

FIG. 20 c, row 2 shows a tapered bottom groove with an axial spring mounted in the groove. The position of the spring is such that the centerline along the minor axis is slightly above the bore, thus positioning the point of contact further away from the end point of the major axis of the coil, resulting in a lower disconnect force.

FIG. 20 c, row 3 shows a tapered bottom groove with an axial spring mounted in the groove. The groove is shown with a 25-degree angle. By increasing the angle, the distance from the end point of the major axis of the coil to the point of contact increases (FIG. 20 c, row 3, column 11 compared to FIG. 20 b, row 9, column 11), resulting in lower connect and disconnect forces. On the other hand, decreasing the taper angle will bring the point of contact closer to the end point of the major axis of the coil, resulting in higher connect and disconnect forces. Increasing the groove angle will increase the spring deflection which will increase the running force (FIG. 19 c, row 2, column 6, FIG. 19 c, row 3, column 8).

FIG. 20 c, row 4 shows a tapered bottom groove with an RF axial spring with the shaft inserted in the opposite direction. The groove width is smaller than the coil height. In this case, again, the point of contact is at the end point of the major axis of the coil and no deflection exists and a disconnect is not possible.

FIG. 20 c, row 5 shows a tapered bottom groove with 45.degree. turn angle spring with the shaft inserted in the convex direction. The groove width is smaller than the coil width. The angular spring deflects axially.

FIG. 20 c, row 6 shows a tapered bottom groove with an RF axial spring filled with an elastomer with a hollow center. The groove width is smaller than the coil height (GW<CH).

FIG. 20 c, row 7 shows a tapered bottom groove with an RF axial spring filled with an elastomer solid, as in FIG. 20 c, row 6 with the groove width smaller than the coil height (GW<CH).

FIG. 20 c, row 8 shows a step round flat bottom groove with an RF axial spring groove with the width smaller than the coil height. This design has a groove with a point of contact that scrapes the wire as the coil moves, removing oxides that may be formed on the surface of the wire. The groove has been designed to provide a lower force at disconnect by increasing the distance between the point of contact and the end point of the major axis of the coil.

FIG. 20 c, row 9 shows an inverted V bottom groove with an RF axial spring. The groove width is smaller than the coil height.

FIG. 20 d, row 2 shows a tapered bottom groove with a counterclockwise radial spring mounted in an RF position. The groove width is smaller than the coil height. Notice the position of the point of contact with respect to the end point at the end of the major axis of the coil. The closer the point of contact to the end point of the major axis of the coil, the higher the force required to disconnect.

FIG. 20 d, row 3 shows a tapered bottom groove with a counterclockwise radial spring mounted in an F axial position. The groove width is smaller than the coil height.

FIG. 20 d, row 4 shows a tapered bottom groove with a clockwise radial spring mounted in an RF axial position. The groove width is smaller than the coil height.

FIG. 20 d, row 5 shows a tapered bottom groove with a clockwise radial spring mounted in an F axial position. The groove width is smaller than the coil height.

FIG. 20 d, row 6 shows a dovetail groove with a counterclockwise radial spring.

FIG. 20 d, row 7 shows a special groove with a counterclockwise radial spring.

FIG. 20 d, row 8 shows an angle of zero to 221/2 degrees flat and tapered bottom groove with a counterclockwise radial spring. The groove width is greater than the coil width. The spring in latching will turn clockwise positioning the coil to reduce the force required to disconnect by positioning the point of contact further away from the end of the end point at the end of the major axis of the coil.

FIG. 20 d, row 9 shows an angle of 0 to 221/2 degrees. The piston groove has a flat and a tapered bottom with a clockwise spring. The spring has an ID to coil height ratio smaller than 4. Under load, this spring has a higher torsional force that requires a higher force to connect or disconnect the shaft. Upon latching, the spring turns clockwise, moving the point of contact closer to the end point of the major axis of the coil (FIG. 20 d, row 9 column 7, column 11) thus increasing the force to disconnect.

FIG. 20 e, row 2 is like FIG. 20 d, row 9 except that in this case, the spring groove has an ID to coil height ratio greater than 4, thus the torsional force applied to the spring at connect or disconnect is substantially lower. As the ratio of the ID of the spring to the coil height increases, the force required to connect or disconnect decreases due to a lower torsional force.

FIG. 20 e, row 3 has an angle groove with a 0.degree. to 22.5.degree. piston groove angle similar to FIG. 20 a, row 4 except that the piston groove in FIG. 20 e, row 3 has a 'V' bottom groove instead of a 'V' bottom groove with a flat. The housing in FIG. 20 e, row 3 has a 'V' bottom groove with a flat at the bottom of the groove. This design permits for specific load points at connect-latched position.

FIG. 20 e, row 4 shows a groove angle 30.degree./221/2.degree. bottom groove with a counterclockwise radial spring. The groove width is greater than the coil width. By changing the groove angle, the distance between the point of contact and the end point of the major axis of the coil is increased, reducing the force at disconnect.

FIG. 20 e, row 5 shows an angle 60.degree./221/2.degree. bottom groove with a counterclockwise radial spring. The groove width is greater than the coil width.

FIG. 20 e, row 6 shows a special V type bottom with a 23.degree. and 60.degree. angle with a counterclockwise radial spring. The groove width is greater than the coil width.

FIG. 20 e, rows 7-8 show a V type bottom groove with 23.degree. and 60.degree. angles like FIG. 20 e, row 6 with a counterclockwise radial spring. The groove width is greater than the coil width. By moving the shaft forward and then back we cause the spring to turn so the point of contact is closer to the end point at the end of the major axis of the coil, increasing the force required to disconnect. When the direction of latching is reversed, the piston is traveling in the direction of the back angle in FIG. 19 e, row 7, as opposed to traveling in the direction of the front angle in FIG. 19 e, row 6. The increased force increases the turning of the spring, thus increasing the distance between the point of contact and the end point of the major axis, increasing the force required to disconnect or unlatch. Compare FIG. 20 e, row 7, column 8 showing the piston moving forward and the position of the point of contact "A" with the position of the point of contact FIG. 20 e, row 8, column 7.

FIG. 20 e, row 9 shows a special V bottom type groove with 22.degree. and 60.degree. angles with a radial spring. The contact point is close to the end point at the end of the major axis of the coil for a higher disconnect force.

FIG. 19 f, rows 2-6 show turn angle springs, assembled in different groove designs. Notice the point of contact position in relation to the end point of the major axis of the coil.

FIG. 20 f, row 2 shows a special V-bottom with 23.degree. and 60.degree. angles with a 20.degree. turn angle spring.

FIG. 20 f, row 3 shows a special V-bottom with 30.degree. and 60.degree. angles with a 20.degree. turn angle spring.

FIG. 20 f, row 4 shows a special V-bottom with 30.degree. and 49.degree. angles with a 20.degree. turn angle spring.

FIG. 20 f, row 5 shows a special groove with a 45.degree. turn angle spring. In this case, the point of contact is closer to the end point at the end of the minor axis of the coil. Upon insertion, the pin will cause the spring to contract radially (FIG. 20 f, row 5, column 2) and causing the coil to deflect along the minor axis (FIG. 20 f, row 5, column 6) and causing the spring coils to turn counterclockwise to connect (FIG. 20 f, row 5, column 7). At disconnect the spring coils will deflect along the minor axis and the coils will continue to turn counterclockwise to disconnect (FIG. 20 f, row 5, column 8). The spring coils will turn clockwise to its original position (FIG. 20 f, row 5, column 9) when the force acting on the spring is released.

FIG. 20 f, row 6 shows a special tapered groove with a 30.degree. angle with a 45.degree. angle at the piston groove. Notice the point of contact in relation to the end point at the end of the major axis of the coil.

FIG. 20 f, row 7 shows a flat bottom-housing groove with a counterclockwise radial spring. The groove width is greater than the coil height. In this case, the piston has a step groove.

FIG. 20 f, row 8 shows a panel mounted design with length of spring with axial loading and holding.

FIG. 20 f, row 8, column 2 shows the panel in an insert position. FIG. 20 f, row 8, column 3 shows the panel in a connected position. FIG. 20 f, row 8, column 4 shows a schematic of the groove design. FIG. 20 f, row 8, column 5 shows the spring being inserted into the cavity. FIG. 20 f, row 5, column 7 shows the spring in a holding position. FIG. 20 f, row 8, column 11 shows an enlarged view of FIG. 20 f, row 5, column 7 with the panel bottoming.

FIG. 20 f, row 9 shows a panel mounting design with length of spring with some axial loading and latching, using a flat tapered groove. The groove width is smaller than the coil height. This particular design will permit axial movement of the panel. FIG. 20 f, row 9, column 3 shows the design in a latch position, which will permit axial movement. FIG. 20 f, row 9, column 7 shows an enlarged view of the latch position. FIG. 20 f, row 9, column 11 shows the point in contact in relation to the end point of the major axis of the coil.

FIG. 20 g, row 2 shows a panel mounting design with length of spring that will permit axial movement of the panel and locking, using a rectangular groove on the housing with the groove width smaller than the coil height.

FIG. 20 g, row 2, column 3 shows the design in a latch axial position, permitting some axial movement. FIG. 20 g, row 2, column 7 shows an enlarged view of the latch locking means and FIG. 20 g, row 5, column 10 shows an enlarged view of the point of contact with end of major axis of the coil.

FIG. 20 g, row 3 shows a panel mounted design using a length of spring. The groove width is smaller than the coil height. FIG. 20 g, row 3, column 2 shows the panel in an inserting position and FIG. 20 g, row 3, column 3 in a latched position with the spring retained in the groove mounted in the housing with the grooves offset from each other. The grooves are offset to provide axial loading in the latched position. In this case, the panel has a V-groove design. Notice the axially loaded position of the spring to prevent axial movement when in a connected-latched position.

FIG. 20 g, row 4 shows a panel assembly similar to FIG. 20 g, row 3 except that the panel has a step flat bottom groove instead of a V-bottom type groove and the panel has a flat tapered bottom groove and it is axially loaded in the connect position. Disconnect in the axial position will not be possible because as the panel is pulled it causes the spring to turn, applying the disconnect component force at the end point of the major axis of the coil where no deflection occurs. The descriptions illustrated in FIG. 20 f, row 8 through FIG. 20 g, row 4 show the holding, latching, and locking in the axial position. Separation of the panel from the housing can be done by sliding the panel longitudinally.

The designs indicated in FIG. 20 f, row 8 through FIG. 20 g, row 4 show a panel mounted design; however the design could also be applicable to other designs, such as cylindrical, rectangular, elliptical or other types of surfaces. All designs are shown with GW<CH; however the groove could be made wider to be GW<CH with lower connect-disconnect force.

The designs are shown with specific dimensions, angles and groove configurations. These values can be changed to other angles and groove configurations while achieving the results indicated.

Spring Characteristics that Affect Performance

Spring Design and Installation Factors

Using an axial spring to enhance retention of the spring in the groove or using a radial spring turned into an axial spring at installation.

Using an axial spring or a radial spring turned into an axial spring at installation to increase initial insertion, running and disconnect forces Changing the Coil Width to Coil Height Ratio When the coil width to height ratio is close to one, the spring will turn easier reducing forces since the spring is round.

The smaller the coil width to coil height ratio, the smaller the back angle. The smaller the back angle, the higher the insertion force required when the piston is inserted in the spring into the back angle first. The opposite is true when the coil width to coil height ratio is reversed, i.e., the back angle is larger and the insertion forces are lower.

Using an F axial spring to increase the insertion running and disconnect forces compared to an RF spring.

Using an RF axial spring to reduce the insertion, running, and disconnect forces.

Using an offset axial spring to reduce the initial insertion running force, and disconnect forces.

Using a length of spring mounted in an axial type groove for panel applications

Using a spring with a ratio of ID to coil height to vary insertion, connect and the disconnect forces. As the ratio increases, the forces will decrease or vice versa as the ratio decreases the forces increase.

Using springs with varying turn angles to vary forces.

Using an axial spring with offset coils where the groove width is smaller than the coil height and addition of the coil height of the various coils to reduce insertion, running, connect, and disconnect forces and the ratio of connect to disconnect force.

The connect/disconnect forces decrease as the ratio of ID to coil height increases.

Using variable means to form the ring, ranging from threading the ends, latching the ends, interfacing the ends and butting as opposed to welding.

Varying the Device Geometry to Control the Forces

Designing the groove geometry to position the point of contact at disconnect relative to the end point of the major axis of the coil.

Positioning the end point of the spring major axis. The shorter the distance to the contact point, the higher the force required to disconnect.

Positioning the end point of the spring minor axis. The shorter the distance to the contact point, the lower the force required to disconnect.

Varying the groove design and insertion direction to vary the force.

Varying the groove geometry so that the spring torsional force in the latched position is in an axial direction thus increasing the force required to disconnect and minimizing axial play.

Position the latching grooves so that they are offset, causing the axial or radial spring coils to turn, introducing an axial force that reduces axial play and increases the force required to connect-disconnect. FIG. 19 g, row 5, column 12; row 2, FIG. 20 a, row 6, column 6 and row 8, column 6.

Figure 13E:
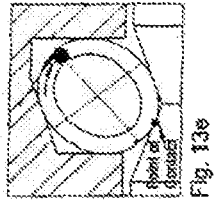
FIGS. 13A-13E show a latching axial spring in an axial groove designed for high disconnect to insertion ratio with the spring shown in an axially loaded position to limit axial play, the spring coils assuming a turn angle position that increases force and provides higher conductivity with reduced variability.
Figure 13D:
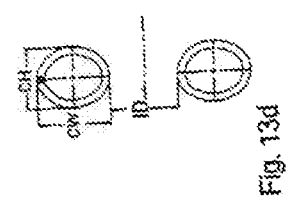
Figure 12E:
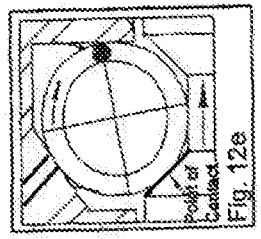
Figure 12D:
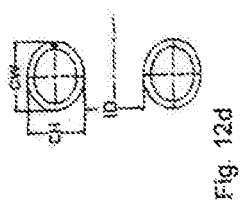
Figure 13C:
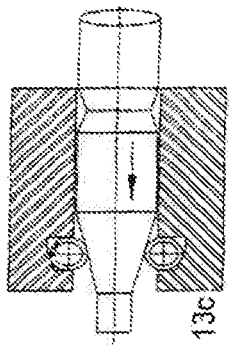
Figure 13B:
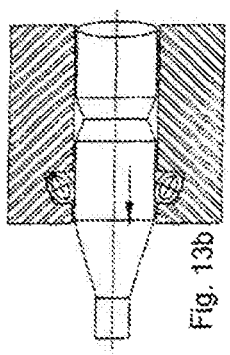
Figure 13A:
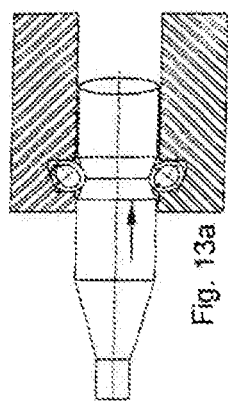
Figure 15J:
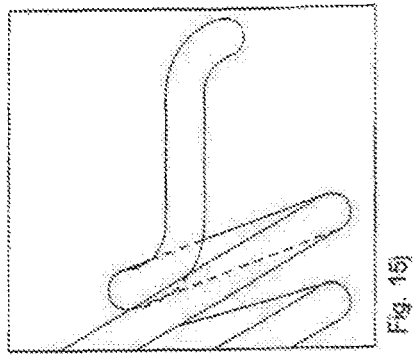
FIGS. 15A-15K show a spring with end joined by a male hook and step-down circular female end to form a continuous circular spring-ring without welding.
Figure 15K:
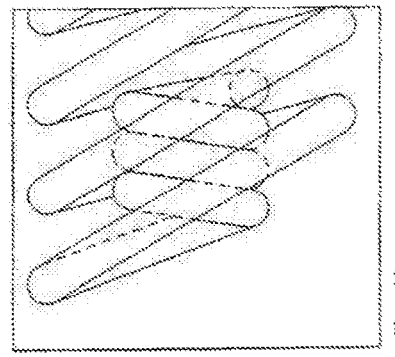
Figure 15C:
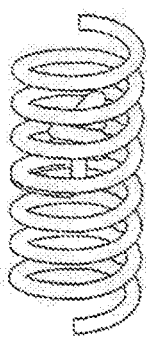
Figure 15F:
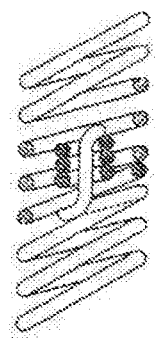
Figure 15H:
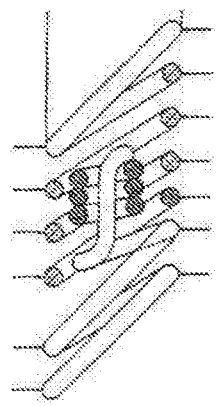
Figure 15I:
Figure 15B:
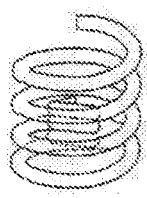
Figure 15E:
Figure 15G:
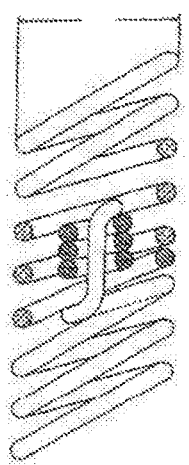
Figure 15A:
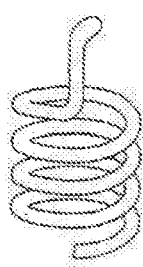
Figure 15D:
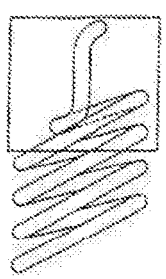
Figure 16K:
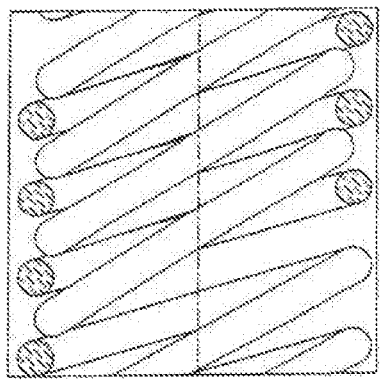
FIGS. 16A-16L show a spring with the coil ends connected by interlacing the end coils to form a continuous spring-ring without welding or joining.
Figure 16L:
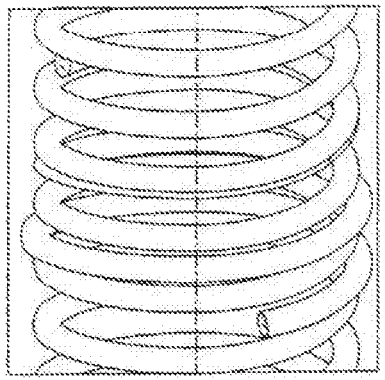
Figure 16C:
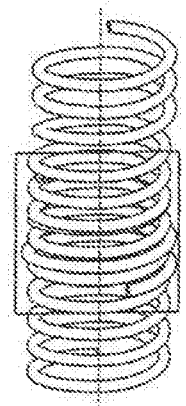
Figure 16B:
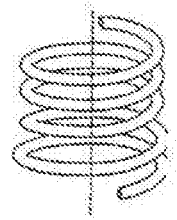
Figure 16A:
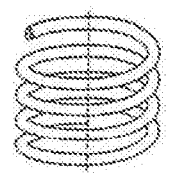
Figure 16F:
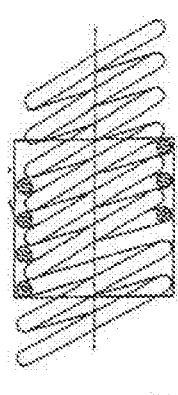
Figure 16E:
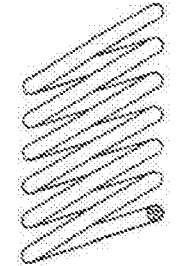
Figure 16D:
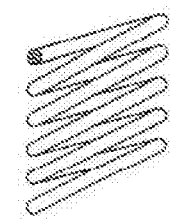
Figure 16I:
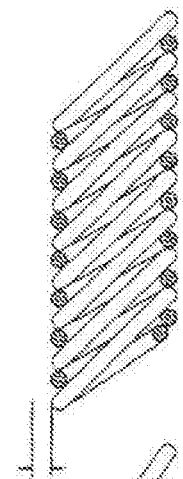
Figure 16H:
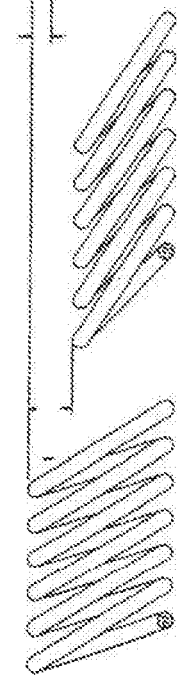
Figure 16G:
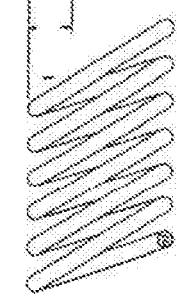
Figure 16J:
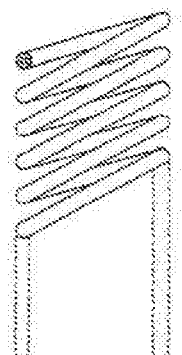
Figure 17A:
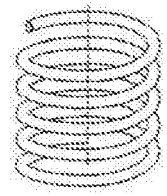
Figure 17B:
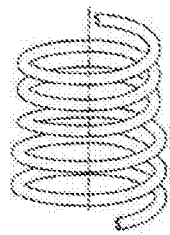
Figure 17C:
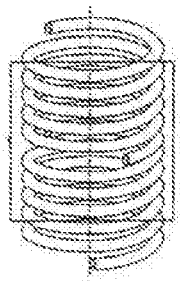
Figure 17D:
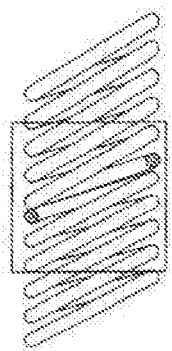
Figure 17E:
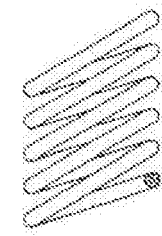
Figure 17F:
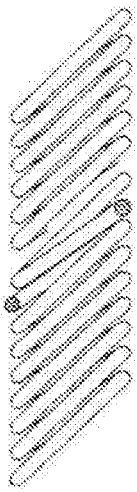
Figure 17G:
Figure 17I:
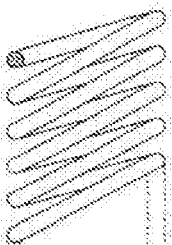
Figure 17J:
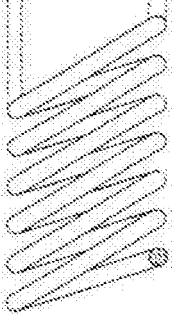
Figure 17K:
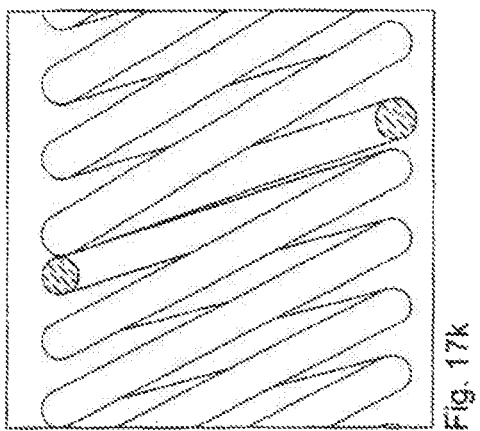
Figure 17L:
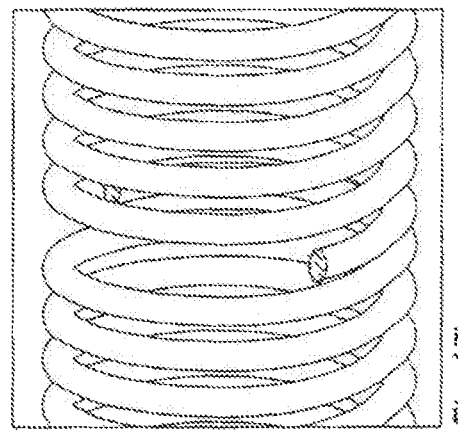
Figures 18D, 18E, 18F:
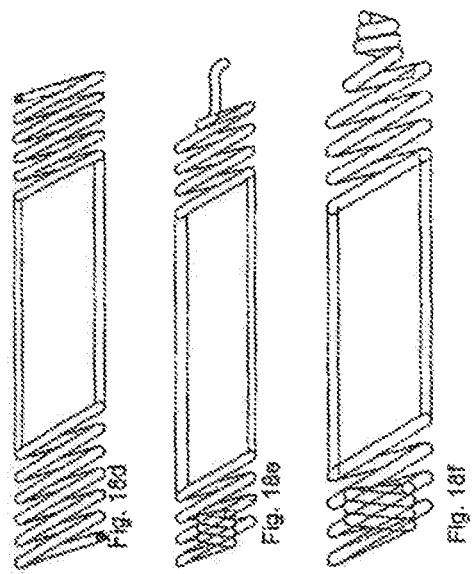
FIGS. 18A-18F show an unwelded spring ring and to be housed in a flat bottom housing groove, front angle in the front, showing the various different designs that could be used to retain the spring in a groove that can be a housing groove or a piston groove.
Figure 18C:
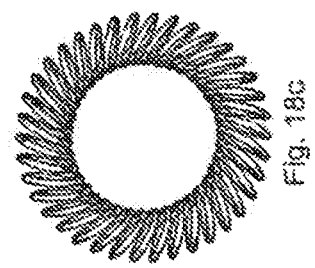
Figure 18B:
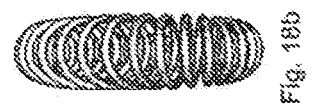
Figure 18A:
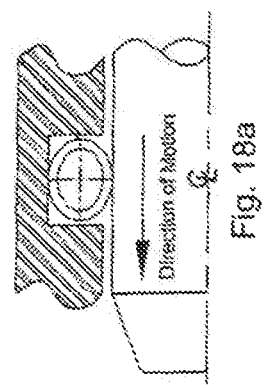

Position the geometry of the latching grooves that will cause the axial and radial spring coils to turn, increasing the force required to connect-disconnect. FIGS. 12e and 13e.

The use of multiple springs and grooves to increase the forces and the current carrying capacity.

The forces vary according to the direction of the piston insertion.

Using threaded grooves with a spring length retained in the groove with a groove width smaller than the coil height.

In accordance with the present invention to attain the maximum disconnect force, the point of contact should be as close as possible to the end of the major axis of the coil. FIG. 19 and FIG. 20 a (rows 5, columns 7 and 11).

To attain the minimum disconnect force, the contact point, should be as close as possible to the end of the minor axis of the coil. FIG. 19 a and FIG. 20 a (row 1, column 7 and 11).

An axial spring with offset coils mounted in a housing with the groove width smaller than the addition of the coil height of the various coils, providing the following features:

Lower spring retention force.
Lower insertion force
Lower ratio of disconnect to connect
Lower ratio of disconnect to running force.
Reference FIG. 19 b and FIG. 20 b, row 6 vs. row 8.

Modification of the groove cavity that affects the position of the point of contact in relation to the end point of the major axis of the coil that affects the force required to disconnect, connect. Reference FIG. 19 b and FIG. 20 b, row 8 vs. row 9 and row 8, column 4 vs. row 9, column 4.

Modification of the groove cavity that affects the position of the point of contact in relation to the end of the major axis of the coil that affects the force required to disconnect-connect. Reference FIG. 19 b and FIG. 20 b, row 9 vs. FIG. 19 c, 20 c, row 2 and FIG. 19 a, 20 a, row 9, column 4 vs. FIG. 20 a, 20 c, row 2, column 4.

The greater the interference between the coil height and the groove width, the higher the force required to disconnect. FIG. 19 a and FIG. 20 a (row 5, column 5 versus FIG. 19 b, 20 b, row 4, column 4) FIG. 19 a, 20 a, row 5, column 5 has interference between the coil height and the groove width while row 6 shows a clearance between the coil height and the groove width.

The higher the position of the coil centerline along the minor axis in relation to the groove depth. (Reference FIG. 19 b and FIG. 20 b, row 8, column 4 versus FIG. 19 c, 20 c, row 2, column 4) the higher the force required to disconnect.

The type of axial spring mounted in a housing or piston RF vs. F with RF having substantially more deflection but lower force compared to F. Reference FIG. 19 a and FIG. 20 a, row 5, column 2, column 5, and column 6 versus row 6, column 2, column 5 and column 6.

Manner and type of spring used affects the force required to connect/disconnect, using an axial RF or an F spring assembled into a groove whose groove width is smaller than the coil height versus a radial spring turned into an axial spring RF or F spring with coils canting clockwise or counterclockwise. Reference FIG. 19 a and FIG. 20 a, rows 5 and 6 versus rows 7, 8, 9 and FIG. 19 b, 20 b row 2 and also row 8 vs. FIG. 19 d, 20 d, rows 2-5.

Direction of movement of the piston or housing a radial spring that affects the force required to connect and disconnect. Reference Tables FIG. 19 d, 20 d, row 8, columns 2, 5, 7 and 11 vs. row 9, column 2, 5, 7, and 11 due to variation that exists between row 8 and row 9 between the point of contact and the point at the end of the major axis of the coil that results in substantial variation in forces.

The greater the insertion force of an axial spring into a groove whose GW<CH, the higher the force required to disconnect (Reference FIG. 19 b, 20 b, row 8, column 5 vs. row 9, column 5).

Radial springs with different ratios of spring ID to coil height mounted in a housing or piston. Reference FIG. 19 d, 20 d, row 9 vs. FIG. 19 e, 20 e, row 2. The greater the ratio the lower the forces.

Variations of groove configuration affecting the connect-disconnect force by varying the groove angle. Reference FIG. 19 e, row 3, column 5, column 7, column 11 vs. row 4, column 5, column 7, column 11. Such angle variation affects the distance between the point of contact and the point at the end of the major axis of the coil. The closer these two points the higher the force required to disconnect.

The effect of axially loading in the latched position or disconnect and the effect on initial disconnect force and travel.

Figure 5A:
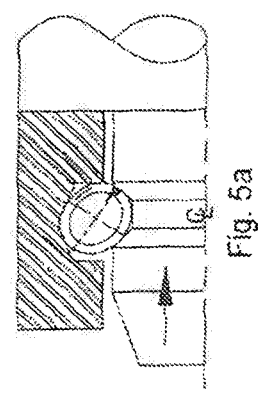
FIGS. 5A-5E show a radial spring axially loaded with the grooves offset in a latched position with a housing bore and piston abutting one another for eliminating axial play, see FIG. 5A. This enhances conductivity and reduces resistivity variation.
Figure 3B:
Figure 4B:
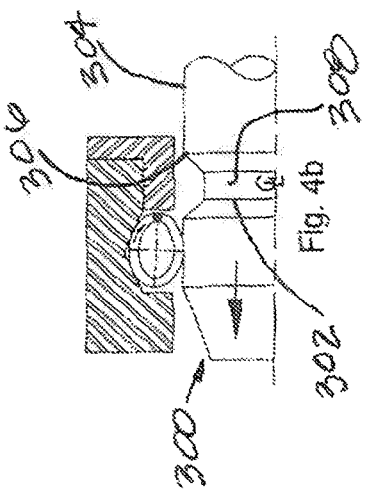
Figure 5B:
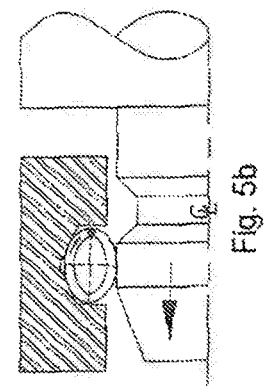
Figure 3C:
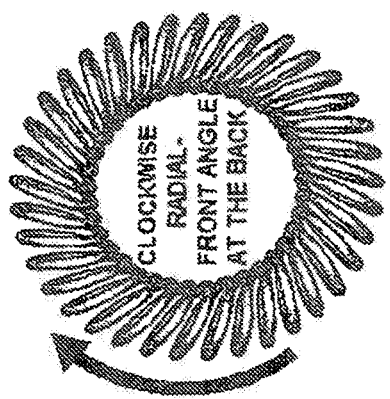
Figure 4C:
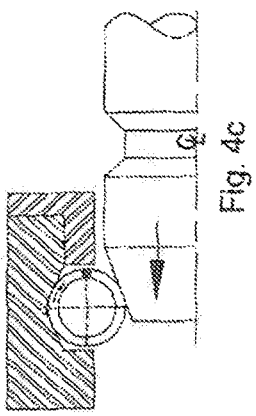
Figure 5C:
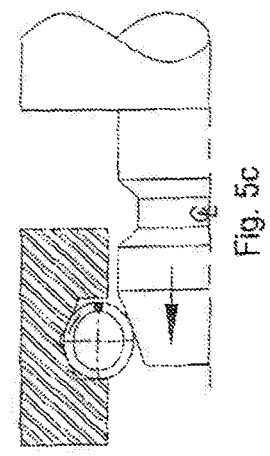
Figure 3D:
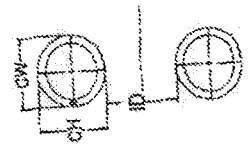
Figure 4D:
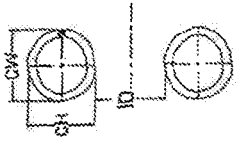
Figure 5D:
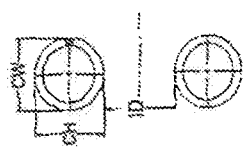
Figure 4E:
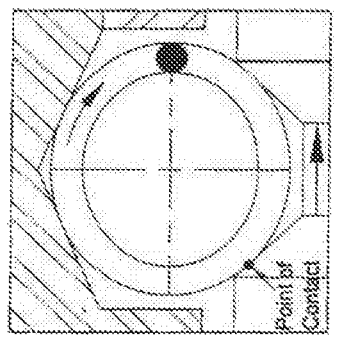
Figure 5E:
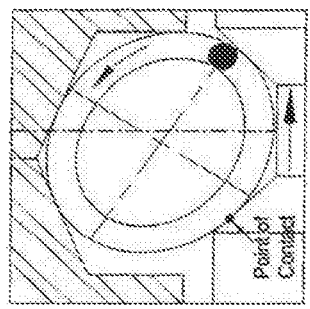
Figure 11E:
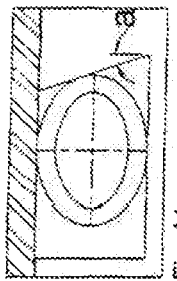
Figure 11D:
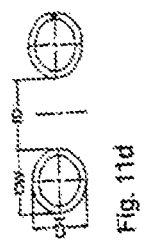

A radial spring axially loaded in the latched position will require a higher initial disconnect force than a non-axially loaded spring. (FIGS. 4a and 4e vs. FIGS. 5a and 5e and FIGS. 4-5f vs. 4-5g. Also FIGS. 6a and 6e vs. FIGS. 7a and 7e and FIG. 6-7g). As shown in FIGS. 5a and 7a, an abutting relationship between a housing bore and piston eliminating axial play upon connection.

In that regard, a housing bore, groove, and piston are oriented for enabling the production of an audible sound indicating a connection between the housing and piston upon abutting of the housing bore and piston.

With reference to FIGS. 5a-5d, a major axis of the coil spring is positioned so that it is above an inside diameter of the housing groove.

With reference to FIGS. 7a-7d, a major axis of the coil spring is positioned so that it is below an outer diameter of the piston groove.

An axially loaded axial spring will develop a higher initial force as shown in FIG. 19 g, row 2, column 3, column 7, column 11 at disconnect than a non-axially loaded, and also FIG. 20 f, row 8, column 3, column 7 and column 11.

Figure 1B:
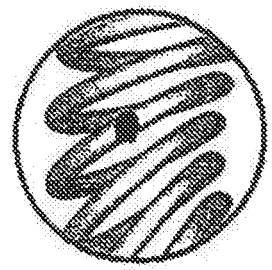
FIG. 1B shows and enlarged view of the coils.
Figure 2B:
FIG. 2B shows a left side view of the spring.
Figure 1A:
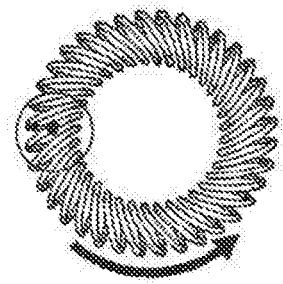
FIG. 1A-shows a front view of a canted coil spring with the coils canting counterclockwise as indicated by the arrow.
Figure 1D:
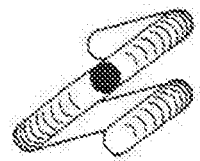
FIG. 1D shows the difference between the lengths of the front angle and the back angle.
Figure 2A:
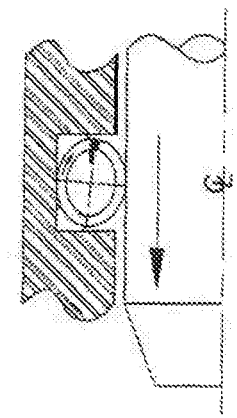
FIG. 2A shows a radial spring in a flat bottom-housing groove.
Figure 3A:
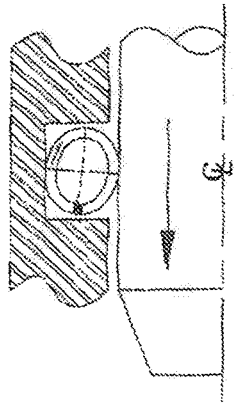
Figure 4A:
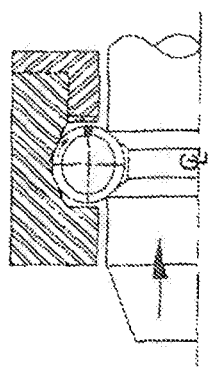
FIGS. 4A-4E show a latching radial spring in a standard latching groove, housing mounted (shown in FIGS. 4A and 4E)

Direction of the spring upon insertion as pointed out by the direction of the arrows. (Canted coil springs always deflect along the minor axis of the coil). The spring turns in the direction of the arrow, as shown in the following:

FIGS. 1a, 1b forward in the direction of the arrow, FIG. 19 a and FIG. 20 a, row 2, column 8 and column 11 in the opposite direction.

An axial spring axially loaded in the latched position will require a higher disconnect force than a non-axially loaded spring.

Recognizing the direction in which the spring will deflect and may turn, assists in selecting the groove configuration. When the load is applied, the spring always deflects along the minor axis of the coil as it is the easiest way to deflect. The spring turns when the ratio of the coil width to the coil height is equal to 1 or greater. As the ratio increases, the ability of the spring coils to turn decreases, causing the spring to deflect instead of turn. Specifically, A spring with different turn angles in conjunction with different grooves to vary the force to connect and disconnect. Turn angles permit the design of the grooves so that the spring does not have to be turned at assembly. Reference FIG. 19 f and FIG. 20 f, rows 2, columns 2, 7, 11 and row 6, columns 2, 5, 7 11;

Disconnect by expanding the ID of the spring and compressing the coils along the minor axis of the coils to affect insertion, connect and disconnect. FIG. 19 f, rows 6-8;

Housing mounted grooves using a single groove versus a split groove. Note: all drawings in FIG. 19 a show a split groove and FIG. 20 a shows a single groove in row 4, column 2;

Panel mounted spring with groove width smaller than the coil height using a spring in length. Axial latching and axial loading the spring to prevent axial movement. FIG. 19 g, rows 2-3, FIG. 20 g, rows 8-9;

Axial loading the spring coils by offsetting the position of the grooves axially between the housing and shaft so as to create an axial load on the spring to reduce or eliminate movement between the shaft and housing. This configuration has a higher force as shown in FIGS. 4-5;

Multiple springs mounted in multiple single grooves of any of the designs in FIGS. 19 a-19 g, FIGS. 20 a-20 g and in FIGS. 1-18f with either radial or axial springs that can be mounted radially or axially with springs for variable force retention, play or no play and conductivity. See FIGS. 8 and 9.

Figure 10D:
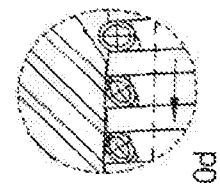

Threaded grooves using a spring length retained in the groove having a groove width smaller than the coil height. FIGS. 10a, 10b and 10d;

Threaded grooves using a radial or turn angle spring in length using a groove having a groove width greater than the coil width (GW>CW) FIG. 19 a, row 1, column 2, row 4, column 2 and FIG. 19 d, rows 6-9 through FIG. 19 f, row 5 and FIG. 20 g, row 2 and FIG. 20 f, row 7 and FIGS. 5, 6, 7 and 8;

Panel mounted in a housing radial or axial spring in length and the spring can be retained in the panel or the housing for axial holding, latching or locking the panel to the housing and when in a latched or locked position the panel may be axially loaded to eliminate axial play;

Various types of spring-ring groove mounted designs with variable means to form a ring, ranging from threading the ends, latching the ends, interfacing the ends and butting, using non-welded springs to form a ring. FIGS. 15, 16, 17, and 18;

Different groove configurations that affect the force parameters, depending on the position of the point load in reference to the end point of the major axis of the coil that affects the ratio of disconnect to insertion, disconnect to running force, and the disconnect forces with a radial spring;

A radial or axial spring whose coil width to coil height ratio is one that will require higher force at connect and disconnect due to the smaller back angle of the coil. The closer the ratio to one the higher the force required to disconnect-connect;

The smaller the groove width to coil height ratio, the higher forces. Reference FIG. 19, row 8, column 4 vs. FIG. 19, row 9, column 4;

Variation of the groove geometry by including a step groove design to control the position of the contact point relative to the end point of the centerline. FIG. 19 f, row 9, column 2, 7, and 11;

Variation of the groove geometry to control the position of the point of contact and the end point of the centerline. FIG. 19 f, rows 6-8;

Device with high forces created by offsetting the centerlines of the grooves as shown in FIG. 20 a, rows 6 and 8;

Reversing the direction of travel in a clockwise or counterclockwise radial spring will switch from the front angle to the back angle or vice versa, thus changing the relative position of the contact point with respect to the end point of the centerline thus varying the forces. See FIG. 19 e and FIG. 20 e, rows 7, column 8 and row 8, column 7 comparing the position of the contact point to the end point centerline; and Retention of radial spring with a dovetail type groove FIG. 19 d and 20 d, rows 6-7.

Although there has been hereinabove described a specific spring latching connectors radially and axially mounted in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:
1. A spring holding electrical connector comprising:
a housing having a bore and at least one open end opening into the bore;
at least two circular grooves located inside the bore of the housing including a first circular groove and a second circular groove, each of said at least two circular grooves comprising a bottom wall;
at least two canted coil springs including a first canted coil spring and a second canted coil spring, each of said at least two canted coil springs being in a ring configuration and each having a plurality of interconnected coils, each coil having a major axis and a minor axis, and the first canted coil spring located in the first circular groove and the second canted coil spring located in the second circular groove;
a piston located at least in part in said bore, said piston comprising a tapered insertion end, a planar end surface extending across a lengthwise axis of the piston at the tapered insertion end, and an exterior surface defining a piston outside diameter;
wherein said first canted coil spring is biased against the bottom wall of the of the first circular groove and against the exterior surface of the piston and said second canted coil spring is biased against the bottom wall of the second circular groove and against the tapered insertion end; and
wherein the piston is without a groove where the first canted coil spring is biased against the exterior surface of the piston in a holding position of the piston within the housing.

2. The spring holding electrical connector according to claim 1, wherein the first canted coil spring is spaced from the second canted coil spring by a distance that is less than the major axis of a coil of the first canted coil spring.

3. The spring holding electrical connector according to claim 1, wherein the bottom wall of the first circular groove comprises two tapered surfaces.

4. The spring holding electrical connector according to claim 3, wherein the first canted coil spring is a radial canted coil spring or an axial canted coil spring.

5. The spring holding electrical connector according to claim 4, wherein the first circular groove has only one sidewall.

6. The spring holding electrical connector according to claim 5, wherein the second circular groove has no sidewall.

7. The spring holding electrical connector according to claim 4, wherein the first circular groove has two sidewalls on either side of the bottom wall.

8. The spring holding electrical connector according to claim 1, wherein the tapered insertion end is a chamfered insertion end.

9. The spring holding electrical connector according to claim 7, wherein the second circular groove has two sidewalls of the bottom wall.

10. The spring holding electrical connector according to claim 4, wherein the housing further comprises a third circular groove located adjacent the second circular groove.

11. The spring holding electrical connector according to claim 10, further comprising a third canted coil spring, said third canted coil spring located in said third circular groove.

12. The spring holding electrical connector according to claim 11, wherein the third circular groove comprises two sidewalls and a bottom wall.

13. The spring holding electrical connector according to claim 11, wherein the second canted coil spring is spaced from the third canted coil spring by a distance that is less than the major axis of a coil of the second canted coil spring.

14. The spring holding electrical connector according to claim 13, wherein the first circular groove has only one sidewall and the third circular groove has only one sidewall.

15. A spring holding electrical connector comprising:
a housing having a bore and at least one open end opening into the bore;
at least two circular grooves located inside the bore of the housing including a first circular groove and a second circular groove, each of said at least two circular grooves comprising a bottom wall;
at least two canted coil springs including a first canted coil spring and a second canted coil spring, each of said at least two canted coil springs being in a ring configuration and each having a plurality of interconnected coils, each coil having a major axis and a minor axis, and the first canted coil spring located in the first circular groove and the second canted coil spring located in the second circular groove;
a piston located at least in part in said bore, said piston comprising a tapered insertion end, a planar end surface extending across a lengthwise axis of the piston at the tapered insertion end, and an exterior surface defining a piston outside diameter;
wherein said first canted coil spring is biased against the bottom wall of the of the first circular groove and against the exterior surface of the piston and said second canted coil spring is biased against the bottom wall of the second circular groove and against the exterior surface of the piston; and
wherein the piston is without a groove where the first canted coil spring is biased against the exterior surface of the piston in a holding position of the piston within the housing and the piston is removable from the housing without the first canted coil spring latching any groove on the piston.

16. The spring holding electrical connector according to claim 15, wherein the bottom wall of the first circular groove comprises two tapered surfaces.

17. The spring holding electrical connector according to claim 15, wherein the first canted coil spring is a radial canted coil spring or an axial canted coil spring.

18. The spring holding electrical connector according to claim 17, wherein the first circular groove has only one sidewall.

19. The spring holding electrical connector according to claim 15, wherein the first canted coil spring is spaced from the second canted coil spring by a distance that is less than the major axis of a coil of the first canted coil spring.

20. The spring holding electrical connector according to claim 18, wherein the second circular groove has no sidewall.

21. The spring holding electrical connector according to claim 17, wherein the first circular groove has two sidewalls on either side of the bottom wall.

22. The spring holding electrical connector according to claim 21, wherein the second circular groove has two sidewalls on either side of the bottom wall.

23. The spring holding electrical connector according to claim 17, wherein the housing further comprises a third circular groove located adjacent the second circular groove.

24. The spring holding electrical connector according to claim 23, further comprising a third canted coil spring, said third canted coil spring located in said third circular groove.

25. The spring holding electrical connector according to claim 24, wherein the third canted coil spring is biased against a bottom wall of the third circular groove and against the tapered insertion end of the piston.

26. The spring holding electrical connector according to claim 24, wherein the third circular groove comprises two sidewalls and a bottom wall.

27. The spring holding electrical connector according to claim 24, wherein the second canted coil spring is spaced from the third canted coil spring by a distance that is less than the major axis of a coil of the second canted coil spring.

28. The spring holding electrical connector according to claim 27, wherein the first circular groove has only one sidewall and the third circular groove has only one sidewall.

29. The spring holding electrical connector according to claim 17, wherein the housing comprises a second open end opening into the bore.

30. The spring holding electrical connector according to claim 15, wherein the tapered insertion end is a chamfered insertion end.

31. A spring holding electrical connector comprising:
a housing having a bore and at least one open end opening into the bore;
three circular grooves located inside the bore of the housing including a first circular groove, a second circular groove, and a third circular groove; each of said three circular grooves comprising a bottom wall;

three canted coil springs including a first canted coil spring, a second canted coil spring, and a third canted coil spring, each of said three canted coil springs being in a ring configuration and each having a plurality of interconnected coils, each coil having a major axis and a minor axis, and the first canted coil spring located in the first circular groove, the second canted coil spring located in the second circular groove, and the third canted coil spring located in the third circular groove;

a piston located at least in part in said bore, said piston comprising a tapered insertion end, a planar end surface extending across a lengthwise axis of the piston at the tapered insertion end, and an exterior surface defining a piston outside diameter;

wherein said first canted coil spring is biased against the bottom wall of the of the first circular groove and against the exterior surface of the piston, said second canted coil spring is biased against the bottom wall of the second circular groove and against the exterior surface of the piston, and said third canted coil spring is biased against the bottom wall of the third circular groove and against the exterior surface of the piston; and wherein the piston is without a groove where the first canted coil spring, the second canted coil spring, and the third canted coil spring are biased against the exterior surface of the piston in a holding position of the piston within the housing.

32. The spring holding electrical connector according to claim 31, wherein the bottom wall of the first circular groove comprises two tapered surfaces.

33. The spring holding electrical connector according to claim 31, wherein the first canted coil spring is a radial canted coil spring or an axial canted coil spring.

34. The spring holding electrical connector according to claim 33, wherein the first circular groove has only one sidewall.

35. The spring holding electrical connector according to claim 31, wherein the first canted coil spring is spaced from the second canted coil spring by a distance that is less than the major axis of a coil of the first canted coil spring.

36. The spring holding electrical connector according to claim 34, wherein the second circular groove has no sidewall.

37. The spring holding electrical connector according to claim 36, wherein the third circular groove has only one sidewall.

38. The spring holding electrical connector according to claim 33, wherein the first circular groove has two sidewalls on either side of the bottom wall.

\* \* \* \* \*